(12) United States Patent
Baghdasarian

(10) Patent No.: US 11,962,272 B2
(45) Date of Patent: Apr. 16, 2024

(54) Z-FOLD SOLAR ARRAY WITH CURVED SUBSTRATE PANELS

(71) Applicant: Maxar Space LLC, Westminster, CO (US)

(72) Inventor: Varouj Baghdasarian, Cupertino, CA (US)

(73) Assignee: Maxar Space LLC, Palo Alto, CA (US)

( * ) Notice: Subject to any disclaimer, the term of this patent is extended or adjusted under 35 U.S.C. 154(b) by 47 days.

(21) Appl. No.: 17/886,152

(22) Filed: Aug. 11, 2022

(65) Prior Publication Data

US 2023/0046563 A1 Feb. 16, 2023

Related U.S. Application Data

(63) Continuation-in-part of application No. 17/505,359, filed on Oct. 19, 2021, which is a continuation-in-part of application No. 17/398,319, filed on Aug. 10, 2021.

(51) Int. Cl.
*H02S 30/20* (2014.01)
*B64G 1/22* (2006.01)
*B64G 1/44* (2006.01)

(52) U.S. Cl.
CPC .............. *H02S 30/20* (2014.12); *B64G 1/222* (2013.01); *B64G 1/443* (2013.01)

(58) Field of Classification Search
CPC .......... H02S 30/20; B64G 1/222; B64G 1/443
See application file for complete search history.

(56) References Cited

U.S. PATENT DOCUMENTS

| | | | |
|---|---|---|---|
| 4,747,567 A | 5/1988 | Johnson et al. | |
| 5,785,280 A | 7/1998 | Baghdasarian | |
| 5,833,176 A | 11/1998 | Rubin et al. | |
| 6,637,702 B1 | 10/2003 | McCandless | |

(Continued)

FOREIGN PATENT DOCUMENTS

CN 105501468 A 4/2016

OTHER PUBLICATIONS

Non-final Office Action dated Dec. 7, 2023, U.S. Appl. No. 17/505,359, filed Oct. 19, 2021.

(Continued)

*Primary Examiner* — Lindsey A Buck
(74) *Attorney, Agent, or Firm* — Vierra Magen Marcus LLP

(57) ABSTRACT

A solar array structure for a spacecraft includes one or a pair of flexible blanket or other foldable solar arrays (such as flexible panels) and a deployable frame structure. The deployable frame structure includes a T-shaped yoke structure, a T-shaped end structure, and one or more rigid beams, the T-shaped yoke structure connectable to the spacecraft. When deployed, the frame structure tensions the flexible blanket solar array or arrays between the T-shaped yoke structure and the T-shaped end structure. When stowed, the flexible blanket solar array or arrays are folded in an accordion manner to form a stowed pack or packs between the cross-member arms of the T-shaped yoke structure and the T-shaped end structure, also stowed in its own Z-fold arrangement. The cross-member arms of the T-shaped end structure can include a solar array that can provide power before deployment while the flexible blanket solar array is stowed.

20 Claims, 32 Drawing Sheets

(56) References Cited

U.S. PATENT DOCUMENTS

| | | |
|---|---|---|
| 7,211,722 B1 | 5/2007 | Murphy |
| 8,636,253 B1 | 1/2014 | Spence et al. |
| 8,683,755 B1 | 4/2014 | Spence et al. |
| 8,893,442 B1 | 11/2014 | Spence et al. |
| 9,120,583 B1 | 9/2015 | Spence et al. |
| 9,156,568 B1 | 10/2015 | Spence et al. |
| 9,346,566 B2 | 5/2016 | Spence et al. |
| 9,444,004 B1 | 9/2016 | Spence et al. |
| 9,450,131 B1 | 9/2016 | Spence et al. |
| 9,580,190 B1 | 2/2017 | Spence et al. |
| 9,604,737 B2 | 3/2017 | Spence et al. |
| 9,611,056 B1 | 4/2017 | Spence et al. |
| 9,620,658 B1 | 4/2017 | Spence et al. |
| 9,676,501 B1 | 6/2017 | Spence et al. |
| 9,899,559 B2 | 2/2018 | Spence et al. |
| 10,189,582 B1 | 1/2019 | Spence et al. |
| 10,239,642 B1 | 3/2019 | Spence et al. |
| 2016/0201372 A1 | 7/2016 | Baghdasarian |
| 2017/0081046 A1 | 3/2017 | Spence et al. |
| 2022/0190779 A1 | 6/2022 | Eskenazi et al. |

OTHER PUBLICATIONS

Non-final Office Action dated Nov. 21, 2023, U.S. Appl. No. 17/398,319, filed Aug. 10, 2021.
U.S. Appl. No. 17/398,319, filed Aug. 10, 2021.
U.S. Appl. No. 17/505,359, filed Oct. 19, 2021.
Restriction Requirement dated Aug. 23, 2023, U.S. Appl. No. 17/398,319, filed Aug. 10, 2021.
Restriction Requirement dated Aug. 23, 2023, U.S. Appl. No. 17/505,359, filed Oct. 19, 2021.
Response to Restriction dated Aug. 30, 2023, U.S. Appl. No. 17/398,319, filed Aug. 10, 2021.
Response to Restriction dated Aug. 30, 2023, U.S. Appl. No. 17/505,359, filed Oct. 19, 2021.
Response to Office Action dated Feb. 15, 2024, U.S. Appl. No. 17/398,319, filed Aug. 10, 2021.

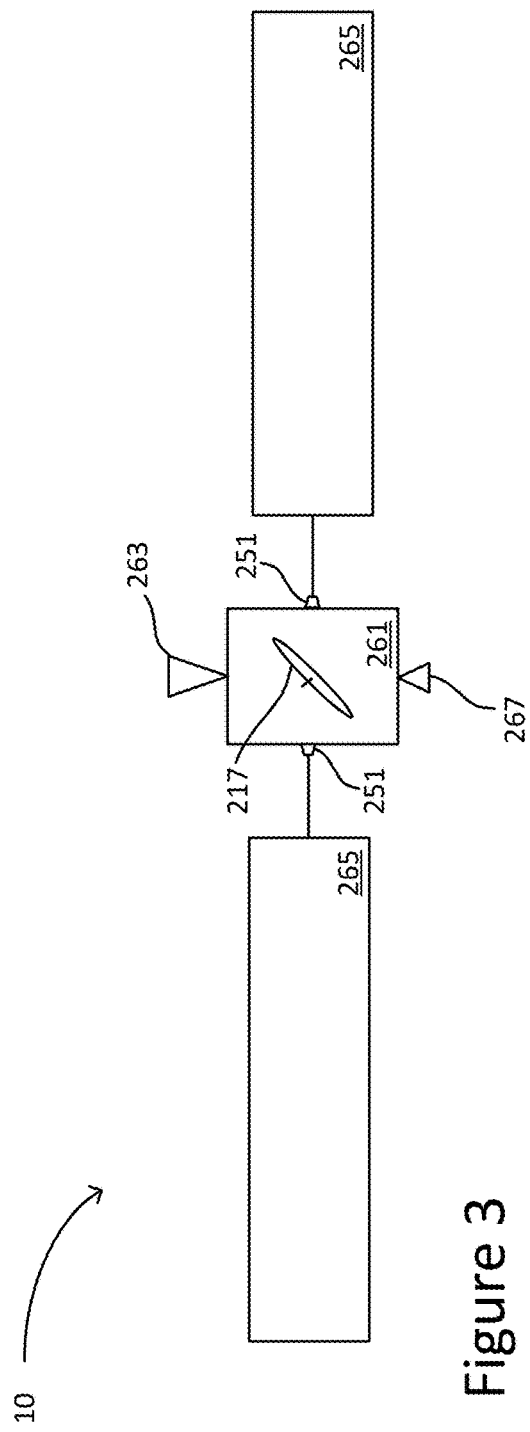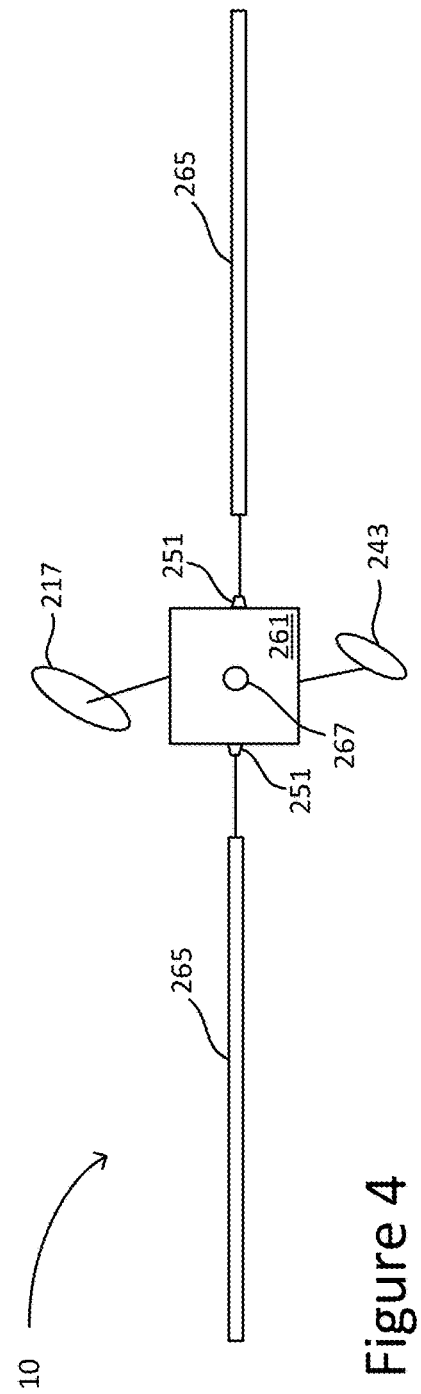

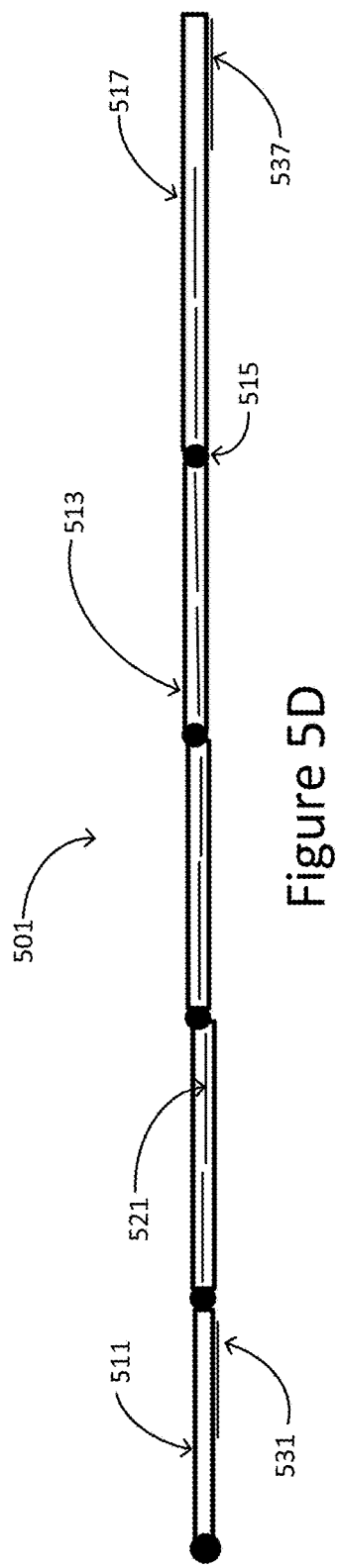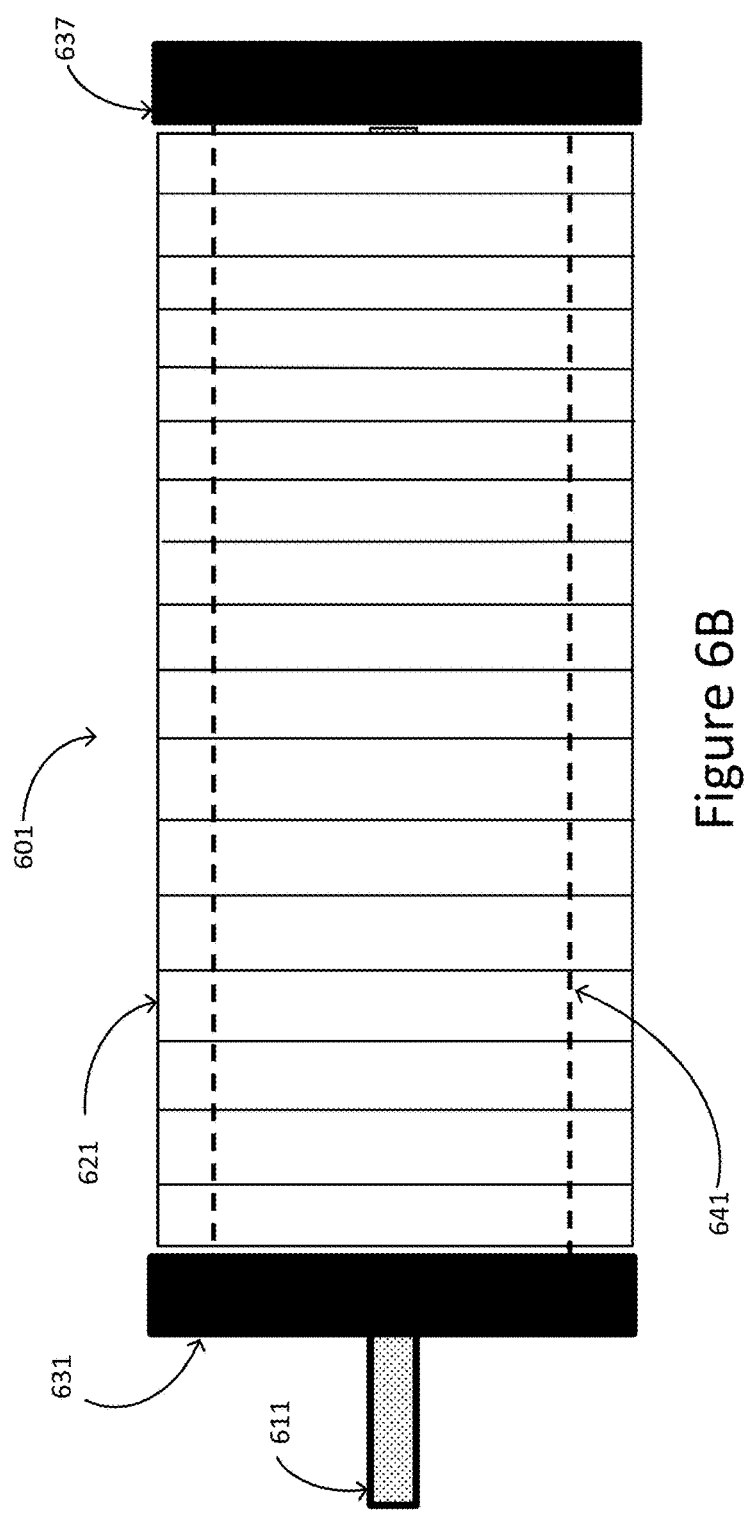

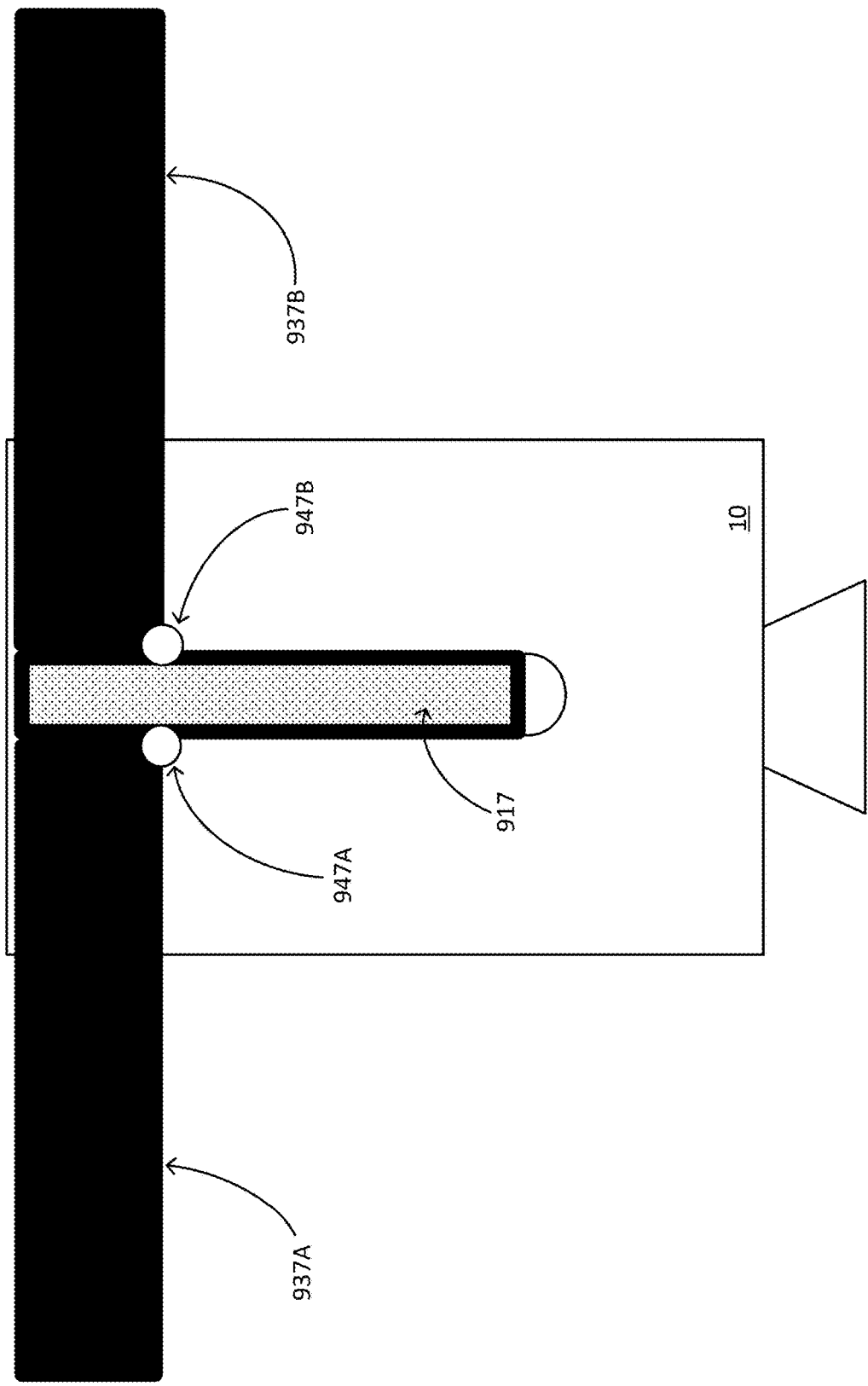

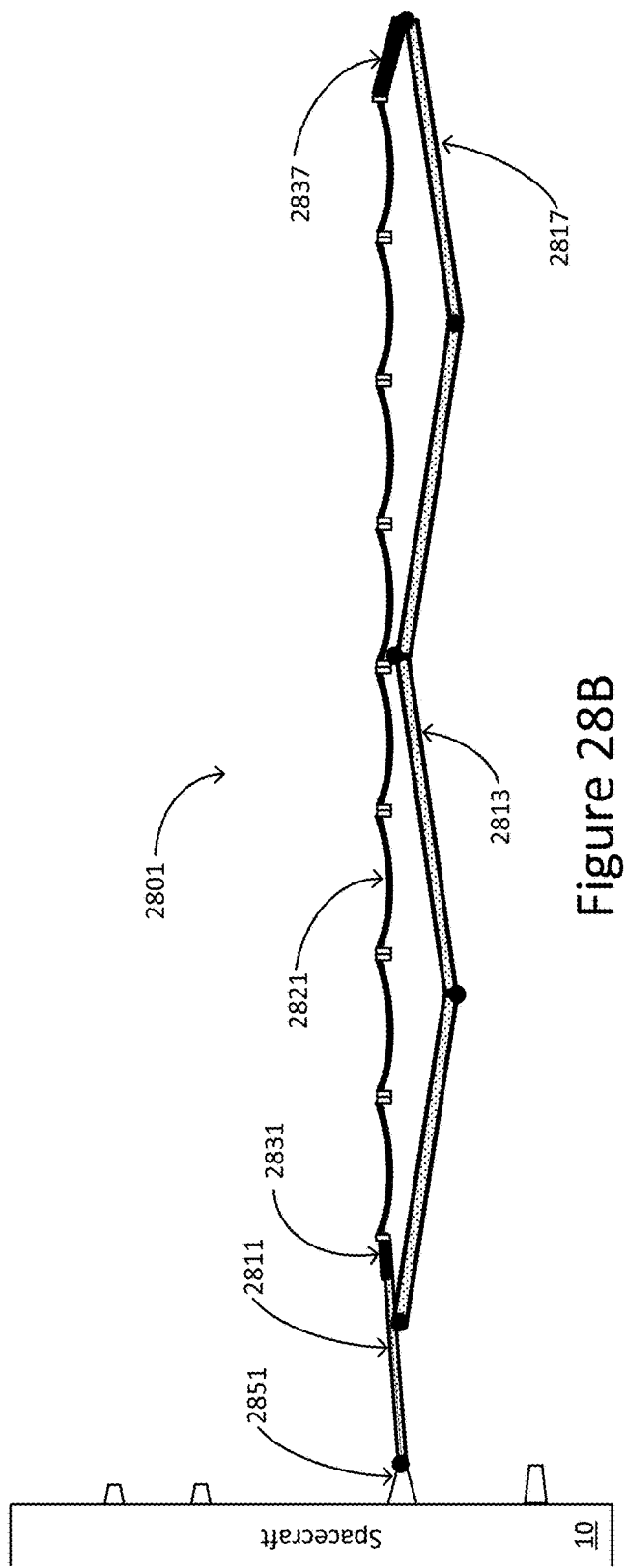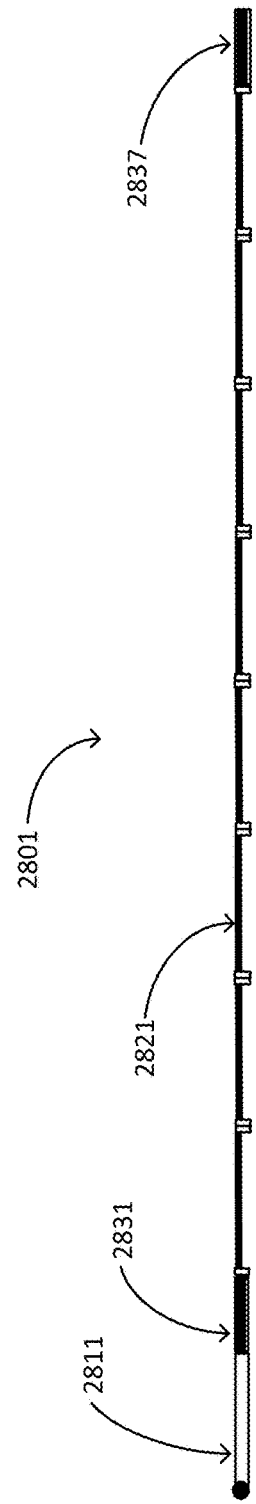

Z-FOLD SOLAR ARRAY WITH CURVED SUBSTRATE PANELS

CROSS-REFERENCE TO RELATED APPLICATION

This application is a Continuation-in-Part of U.S. patent application Ser. No. 17/505,359, filed Oct. 19, 2021, published as U.S. Publication No. 2023/0049753 on Feb. 16, 2023, which is a Continuation-in-Part of U.S. patent application Ser. No. 17/398,319, filed Aug. 10, 2021, published as U.S. Publication No. 2023/0050780 on Feb. 16, 2023, both of which are incorporated herein by reference in their entirety.

BACKGROUND

To provide operating power, satellites use solar array structures with a large surface area of photovoltaic cells to generate electricity from the sunlight incident on the array structure. For shipment and launch the solar array is stowed to have a small volume and then deployed once the spacecraft has been launched. For launch purposes, the smaller the volume and the lower the weight, the better. Once fully deployed, it is desirable that the solar array structure provide a light weight, stiff, strong, stable, and flat surface of sufficient surface area that can allow uniform exposure to the sun and minimize on-orbit spacecraft attitude control disturbance while meeting the satellite's power requirements. These conflicting needs result in an ongoing pursuit of improvements in the design of such solar arrays.

BRIEF DESCRIPTION OF THE DRAWINGS

FIGS. 3 and 4 illustrate two views of a spacecraft with deployed solar arrays.

FIG. 5D is a side view of the deployed Z-fold flexible blanket solar array structure of FIGS. 5A, 5B, and 5C.

FIGS. 6A and 6B illustrate another embodiment of a Z-fold flexible blanket solar array in a stowed configuration and a deployed configuration, respectively.

FIGS. 9A-9D illustrate an embodiment in which the solar panels on the on the arms of the T-shaped support structures fold when stored.

FIGS. 28A-28C illustrate the deployment of the embodiment of the solar array structure from the stowed configuration of FIG. 23.

DETAILED DESCRIPTION

A solar array structure for a satellite or other spacecraft is made up of one or a pair of flexible blanket solar arrays and a deployable frame structure. The deployable frame structure includes a T-shaped yoke structure, a T-shaped end structure, and one or more rigid beams, where the T-shaped yoke structure connects to the spacecraft. When deployed, the frame structure tensions the flexible blanket solar array or arrays between the T-shaped yoke structure and the T-shaped end structure. When stowed, the flexible blanket solar array or arrays are folded in an accordion manner to form a stowed pack or packs between the cross-member arms of the T-shaped yoke structure and the T-shaped end structure of the frame structure, which is also stowed in its own Z-fold arrangement. The surface of the cross-member arms of the T-shaped end structure can include a solar array that can provide power before deployment while the flexible blanket solar array is still stowed. To allow for longer cross-arms, and a larger area exposed solar array when stowed, in some embodiments the cross-member arms can fold inward when stowed.

In an alternate set of embodiments, the solar array is made up of a set of solar array panels with a curved, flexible substrate. When in a stowed configuration, the curvature adds rigidity to the structure to make it more resistant to vibration and stiction. When deployed, the frame structure stretches the panels flat to increase solar efficiency.

Figure 1:
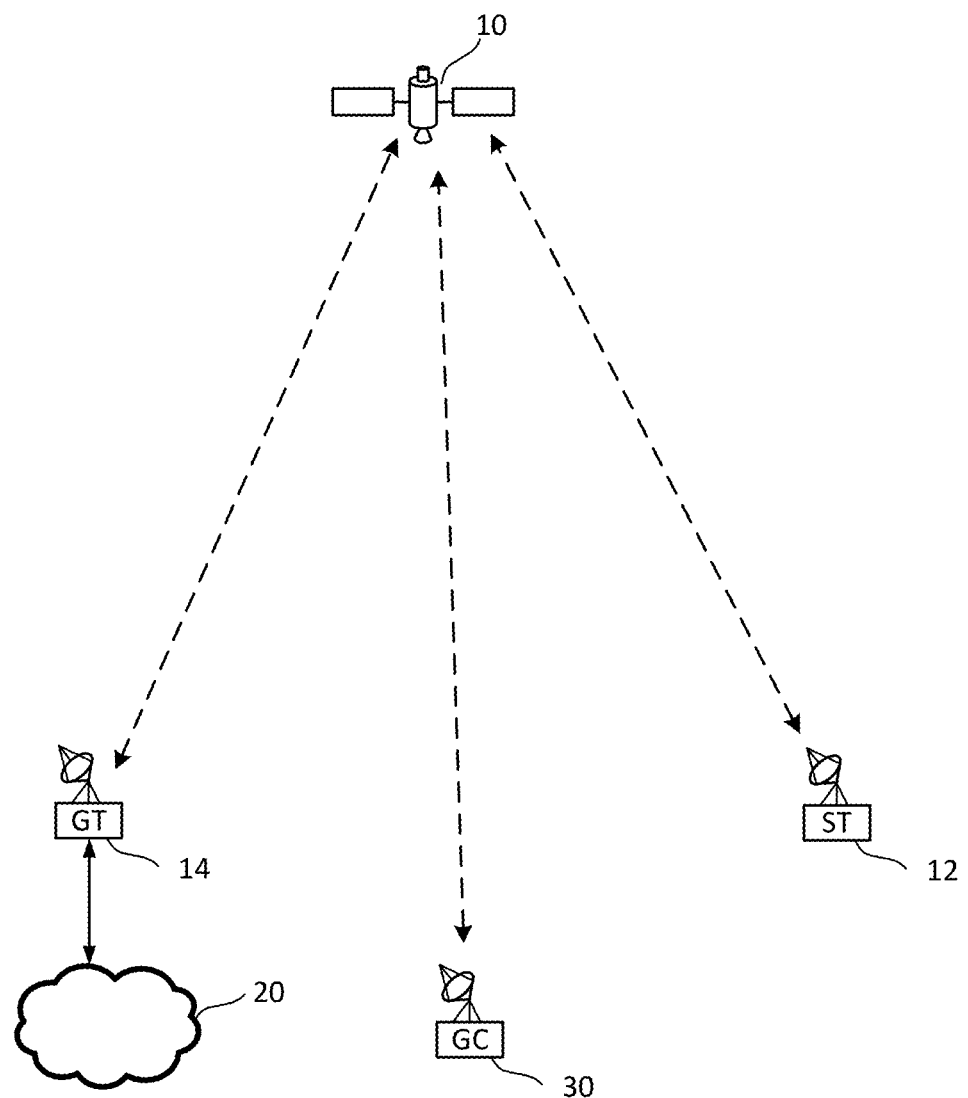
FIG. 1 is a block diagram of a spacecraft system.

FIG. 1 is a block diagram of a spacecraft system that can implement the technology proposed herein. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows spacecraft 10 to provide internet connectivity to a plurality of subscriber terminals (e.g., subscriber terminal 12) via gateway 14. Ground control terminal 30 is used to monitor and control operations of spacecraft 10. Spacecraft can vary greatly in size, structure, usage, and power requirements, but when reference is made to a specific embodiment for the spacecraft 10, the example of a communication satellite will often be used in the following, although the techniques are more widely applicable, including other or additional payloads such as for an optical satellite.

Figure 2:
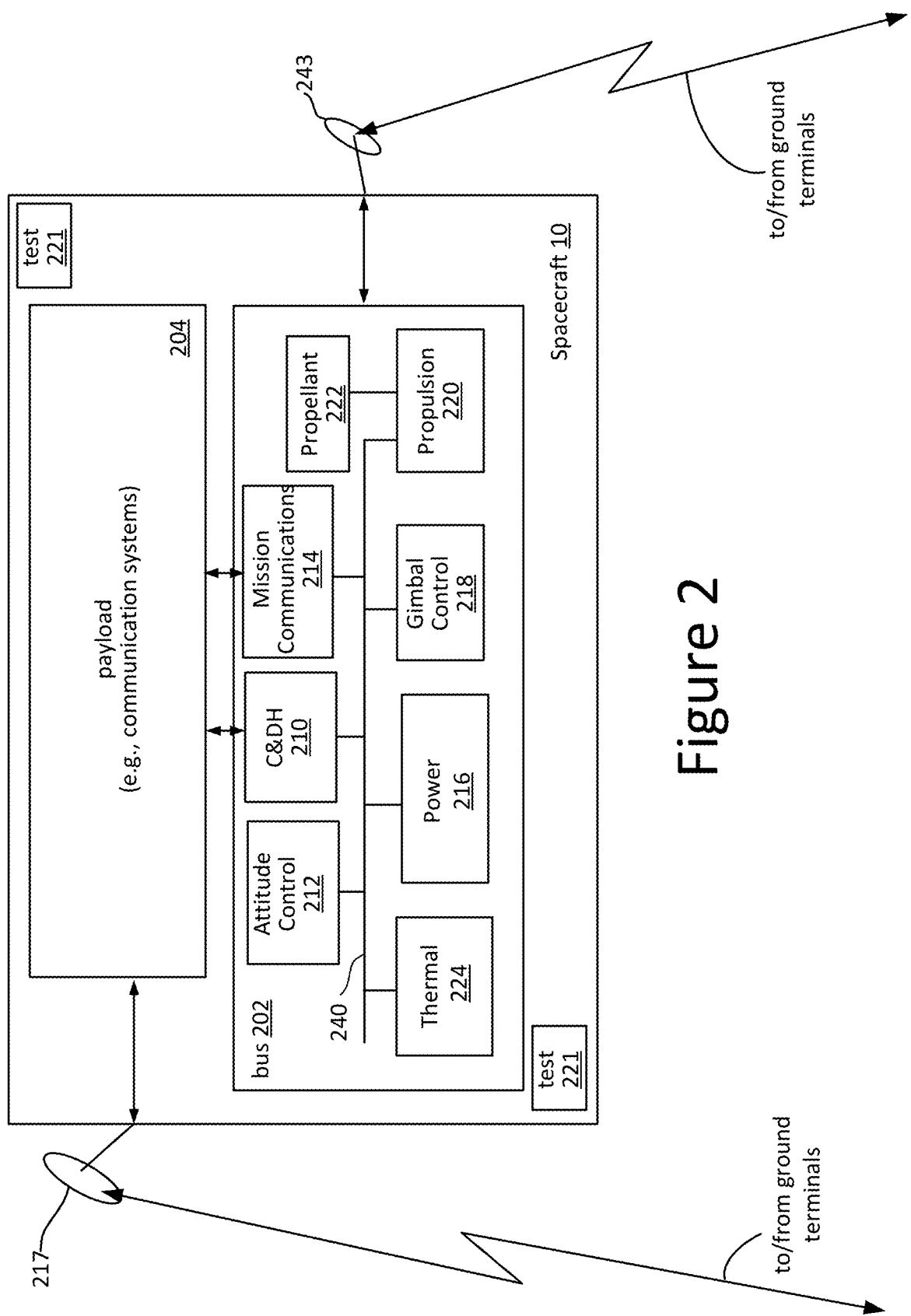
FIG. 2 is a block diagram of an example spacecraft.

FIG. 2 is a block diagram of one embodiment of spacecraft 10, which in one example (as discussed above) is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as a communication satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 210, attitude control systems 212, mission communication systems 214, power subsystems 216, gimbal control electronics 218 that be taken to include a solar array drive assembly, a propulsion system 220 (e.g., thrusters), propellant 222 to fuel some embodiments of propulsion system 220, and thermal control sub-system 224, all of which are connected by an internal communication network 240, which can be an electrical bus (a "flight harness") or other means for electronic, optical or RF communication when spacecraft is in operation. Also represented are an antenna 243, that is one of one or more antennae used by the mission communication systems 214 for exchanging communications for operating of the spacecraft with ground terminals, and a payload antenna 217, that is one of one or more antennae used by the payload 204 for exchanging communications with ground terminals, such as the antennae used by a communication satellite embodiment. The spacecraft can also include a number of test sensors 221, such as accelerometers that can used when performing test operations on the spacecraft. Other equipment can also be included.

The command and data handling module 210 includes any processing unit or units for handling includes command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/ commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for a communication satellite and includes an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

FIGS. 3 and 4 look an exterior view for an embodiment of spacecraft 10 in more detail. More specifically, FIGS. 3 and 4 show two views of an embodiment of spacecraft 10, where FIG. 4 shows the spacecraft rotated by 90° about the axis of the solar arrays 265 relative to FIG. 3. A number of different embodiments are possible, but the example of FIGS. 3 and 4 can be used to illustrate some of the elements relevant to the current discussion.

Referring to FIGS. 3 and 4, the spacecraft 10 includes a spacecraft body 261 from which extend two, in this example, deployed solar arrays 265. Attached to the body will also be one or more number of antennae 217 and 243 as described above, by which the satellite can receive and transmit signals. Depending on the particulars of the embodiment, a satellite may have a large number of antennae, but only a pair of antennae for exchanging signals with a ground station are shown. Attached to the spacecraft body 261 are a number of thrusters, as shown at 263 and 267, which typically include one or more main thrusters and a number of attitude and orbit control thrusters. Internal to the body will be the spacecraft's frame (not show) within which the functional sub-systems can be installed.

The deployed arrays 265 can include a solar array, a thermal radiating array, or both and include one or more respectively coplanar panels. The deployed arrays 265 can be rotatable by the gimbal control or solar array drive assembly 251 about the longitudinal axis (the left-right axis in FIGS. 3 and 4), in order to achieve or maintain a desired attitude with respect to, for example, the sun. For embodiments in which the deployed arrays 265 include a solar array, the solar array may be articulable so as to be substantially sun facing and electrically connected to the spacecraft 10 to provide power. The deployed solar array 265 may be sized and positioned so as to generate substantially more power from sunlight than would be possible if the solar array were fixedly disposed on the body 261 of the spacecraft 10. For example, in some implementations, the solar array orientation may be rotatable about the longitudinal axis of the spacecraft 10 so that photovoltaic power generating surfaces of the solar array remains substantially sun facing.

For shipping and launching of the spacecraft 10, the solar array is stowed into a small volume. Although the stowed volume is wanted to be as small as practicable, the solar array will also need to be large enough to provide sufficient power for spacecraft operations once deployed. One set of embodiments for a solar array are based on a flexible photovoltaic blanket. Flexible blanket solar arrays use a thin flexible substrate that has mounted to it on one side an array of photovoltaic solar cells (and refractive concentrators) and associated wiring that can be folded into a small and compact package for stowage; and is attached to the deployable solar array structure for unfurling during deployment into a flat, aligned, and tensioned configuration when fully deployed. The following presents embodiments for a blanket solar array that can be compactly stowed and then efficiently deployed to provide an effective solar array for spacecraft operations.

Once launched, a spacecraft will typically need to perform orbit raising and other maneuvers that require power before the solar arrays can be deployed and activated, where this power will usually need to be provided by batteries within the power subsystems 216. As batteries add weight, they are often kept to near the minimum that can still meet the spacecrafts needs. Therefore, it is critical to deploy the solar array as soon as possible before the batteries are drained. In addition to battery power, having a source of solar power before solar array deployment would be extremely beneficial to orbit raising operations of a spacecraft as this could provide additional power and charging capability in contingency situations.

Although flexible blanket solar arrays of different shape and forms have been used for spacecraft previously, they have not been capable of providing power in their stowed configuration. Embodiments described below present structural configurations that not only accommodates use of a blanket solar array, but also provide some power in its stowed configuration. As described in more detail in the following, this is accomplished by stowing the blanket between two T-shaped rigid structural members connected to each other by narrow structural beams. Stowed power is provided by solar cells mounted on the outboard T-structure. In one set of embodiments, the blanket solar array is stretched between the two T-shaped structures when deployed, and folded between the two top wider sections of the T structures in its stowed configuration. Deployment of the structural members can be synchronized by cable loops such that all members deploy in a predictable fashion and lock up to form a rigid structure with required strength and stiffness, where in addition to providing structure for the blanket solar array, the deployment structure provides a surface for mounting solar cells to generate power in the stowed configuration.

More specifically, embodiments are presented here for a Z-fold flexible blanket solar array structure. The structure includes a T-shape rigid structure yoke, a T-shape end structure and sections of rigid beam, where the rigid structures are connected to each other through hinges and synchronized to deploy from the stowed to the deployed configuration. The blanket solar panel can be folded and stowed between the inboard T-yoke and the outboard T-structure in stowed configuration, with deployment of rigid structure unfolding the blanket from stowed to deployed configuration. Embodiments can be configured where blanket solar array is split in two sections, one on either side of the deploying structure, or with a one piece blanket solar array, where the deploying structure is located behind the blanket. The outboard surface of the T structure can be populated with solar cells to provide limited power in stowed configuration, and, in additional embodiments, this concept provides the option to double the array capability by stowing two arrays side-by-side on a single yoke.

Figure 5A:
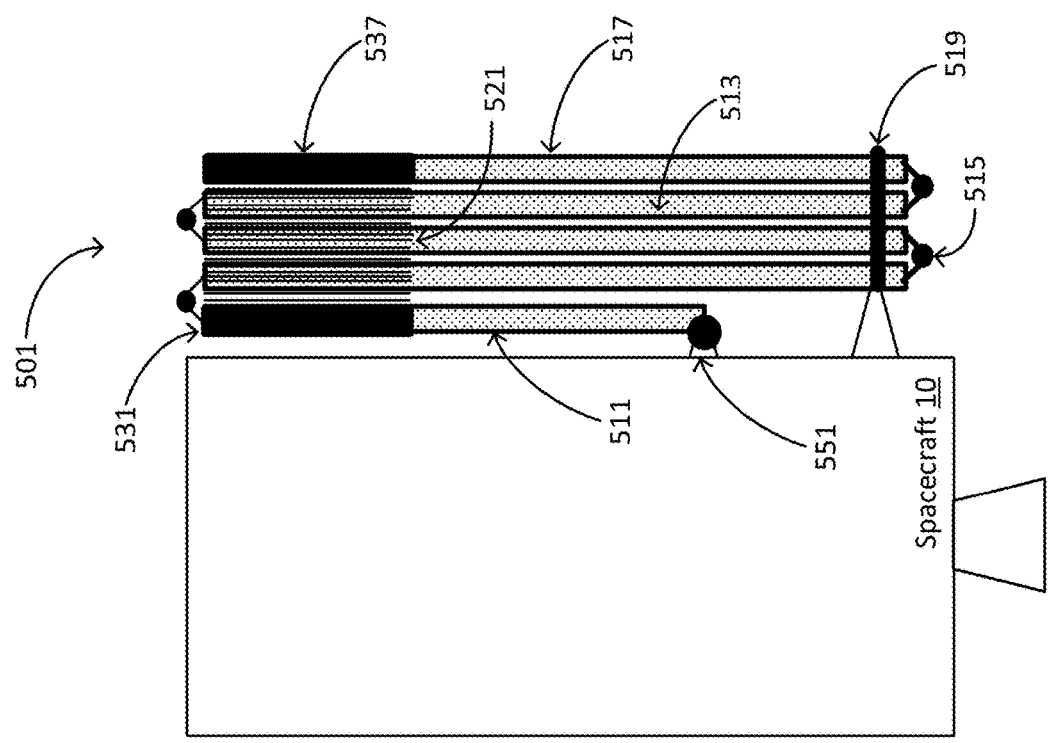
FIGS. 5A, 5B, and 5C illustrate a first embodiment of a Z-fold flexible blanket solar array in a stowed configuration, partially deployed, and a deployed configuration, respectively.
Figure 5B:
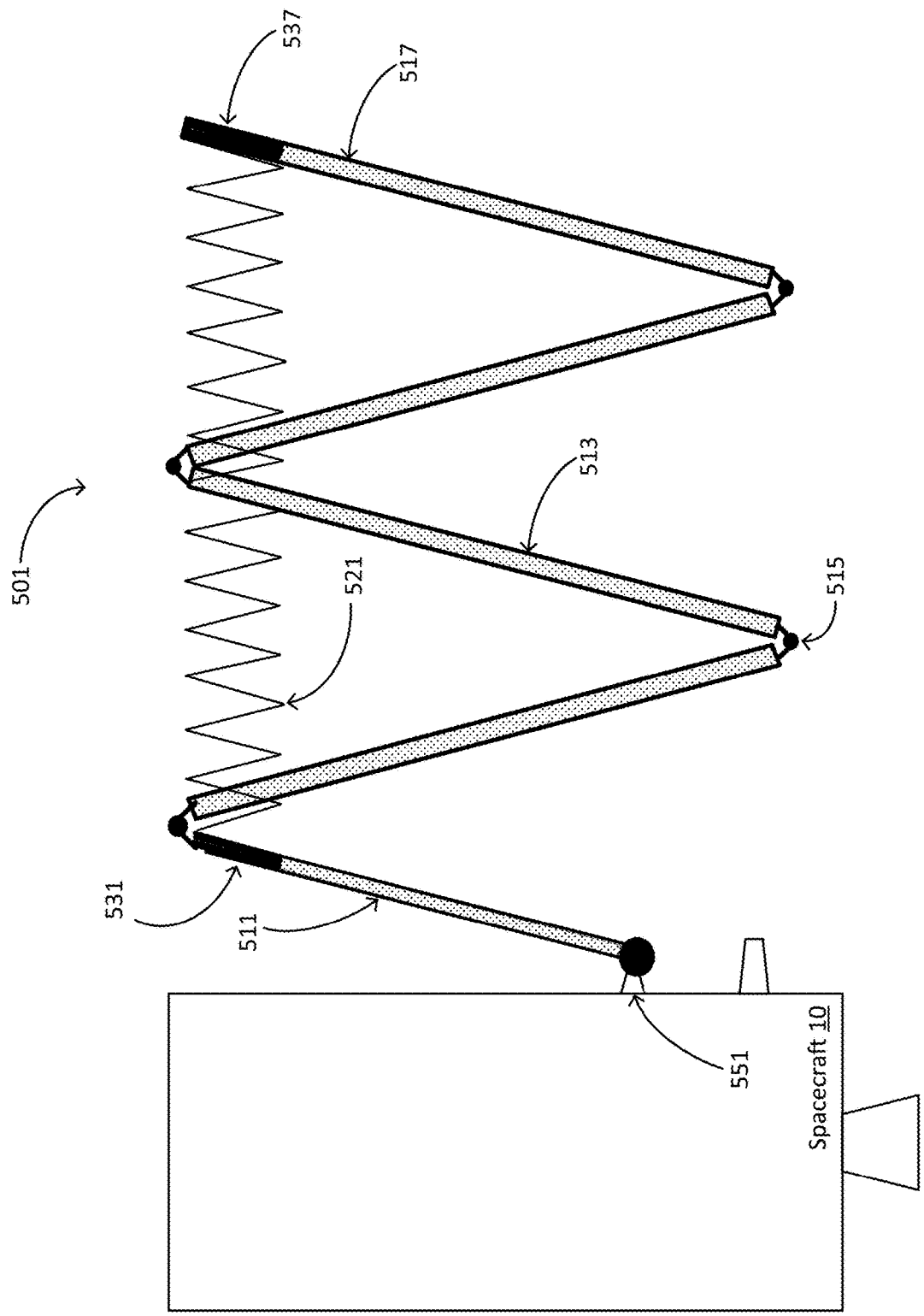
Figure 5C:
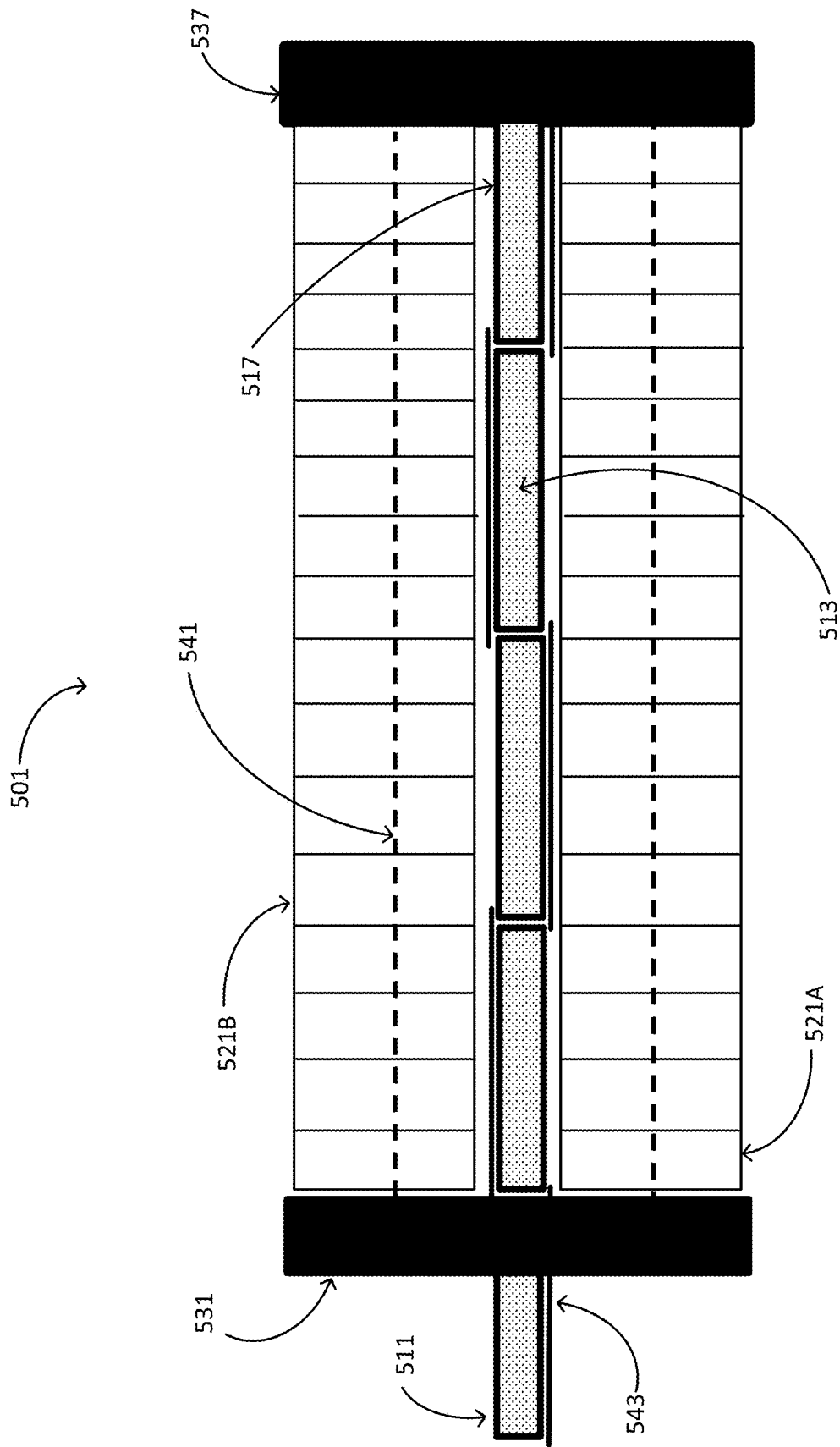

FIGS. 5A, 5B, and 5C illustrate a first embodiment of a Z-fold flexible blanket solar array 501 in a stowed configuration, partially deployed, and a deployed configuration, respectively. FIG. 5D is a side view of the deployed Z-fold flexible blanket solar array structure 501. FIGS. 5A and 5B include the spacecraft 10 to which the solar array 501 is attached, while FIGS. 5C and 5C just show the array structure 501.

The Z-fold flexible blanket solar array structure 501 of FIGS. 5A-5D includes frame structure of a T-shaped rigid structure yoke 511, sections of rigid beam 513, and an outboard T-structure. The components of the rigid frame structure are connected to each other through the hinges 515 and are synchronized to deploy from the stowed configuration of FIG. 5A to the deployed configuration of FIG. 5C. The blanket solar array 521 is connected in its long direction at one end to the inboard T-yoke 511 and at the other end to the outboard T-yoke 517, but unconnected to the intermediate members 513. The blanket solar array 521 is folded and stowed between the inboard T-yoke 511 and the outboard T-yoke 517 in its stowed configuration and can be held in place by one or more hold-downs 519. The deployment of the rigid structure of elements 511, 513, and 517 for its Z-fold stowed configuration can be implemented through the hinges 515, which can be spring loaded, to unfold the blanket solar array 521 from the stowed configuration of FIG. 5A, through the intermediate state of FIG. 5B, to the deployed configuration of FIG. 5C. The outboard T-structure 517 can be populated with a solar cell array 537 to provide stowed power and the inboard T-structure 511 can also be provided with a solar cell array 531.

Considering the deployed structure of FIG. 5C further, this is for a view where the cell side of the Z-fold flexible blanket solar array structure 501 is shown, with the blanket side underneath on the back. (Relative to FIGS. 5A and 5B, those two figures illustrate the stowed and the partially deployed structure where the blanket side is on the upper surface and the cell side on the lower surface.) In this embodiment the blanket solar array has two parts, 521A and 521B, located to either side of the central rigid structure of the T-structures 511 and 517 and rigid beams 513. In one set of embodiment, the backing of the blanket sections 521A and 521B can be formed of a mylar film. Embodiments for the rigid T-structures 511 and 517 and the rigid beams 513 can, for example, be made of hollow graphite rectangular tubes with dimensions of a few inches and a wall thickness of 10s of mils. The length of the rigid T-structures 511 and 517 and the rigid beams 513 is longer than multiple ones of the of the foldable sections of the blanket sections 521A and 521B. The length of the rigid T-structures 511 and 517 and the rigid beams 513, and the number of the rigid beams 513, depends on the chosen size of the blanket array when deployed and size allowable for these pieces of the rigid structure when stowed, as discussed in more detail with respect to FIGS. 7 and 8.

Although this description is given in the context of a flexible blanket solar array, other embodiments based on the use of flexible, semi-rigid, or rigid panels as substitute surfaces for the laydown and bonding of photovoltaic solar cells. As can be seen from the view of FIG. 5A and similar figures, if the panels are connected together by use of hinges or are other otherwise foldable so that they are foldable in the direction extending (when deployed) away from the spacecraft (the axial direction) to form a stowed pack of a plurality of folds, the techniques and structures described here can be applied to such foldable solar arrays. To give some examples, alternate embodiments of a foldable solar array could include a Kapton film, a flexible sheet of graphite a few mils thick, or rigid or semi-rigid honeycomb panels. Although the following will continue to refer to flexible blanket embodiments, it will be understood that alternate embodiments can be based on other foldable solar arrays.

When deployed, the solar array blanket sections 521A and 521B are clamped in place between the T-shaped yoke structure 511 and the outboard T-shaped structure 517. Each of the solar array blanket sections 521A and 521B can include a blanket guide line or string, such as 541, that can extend from a retractable spool, for example, to help tension the solar array blanket sections 521A and 521B. The power generating capacity of the structure when deployed can be increased by the solar arrays 531 and 537 on the structures 511 and 517, with the solar array 537 on the outboard T-structure also supplying power when stowed. To deploy and hold the structure in the extended structure illustrated in FIG. 5C, simple hinges and a closed cable loop, such as made up of the elements 543, can be used to synchronize the deployment process of the rigid T-structures 511 and 517 and the rigid beams 513, where the cable of the closed cable loop structure can be located to the inside of the structure avoid contact with the blanket section or the solar cells.

Figure 7:
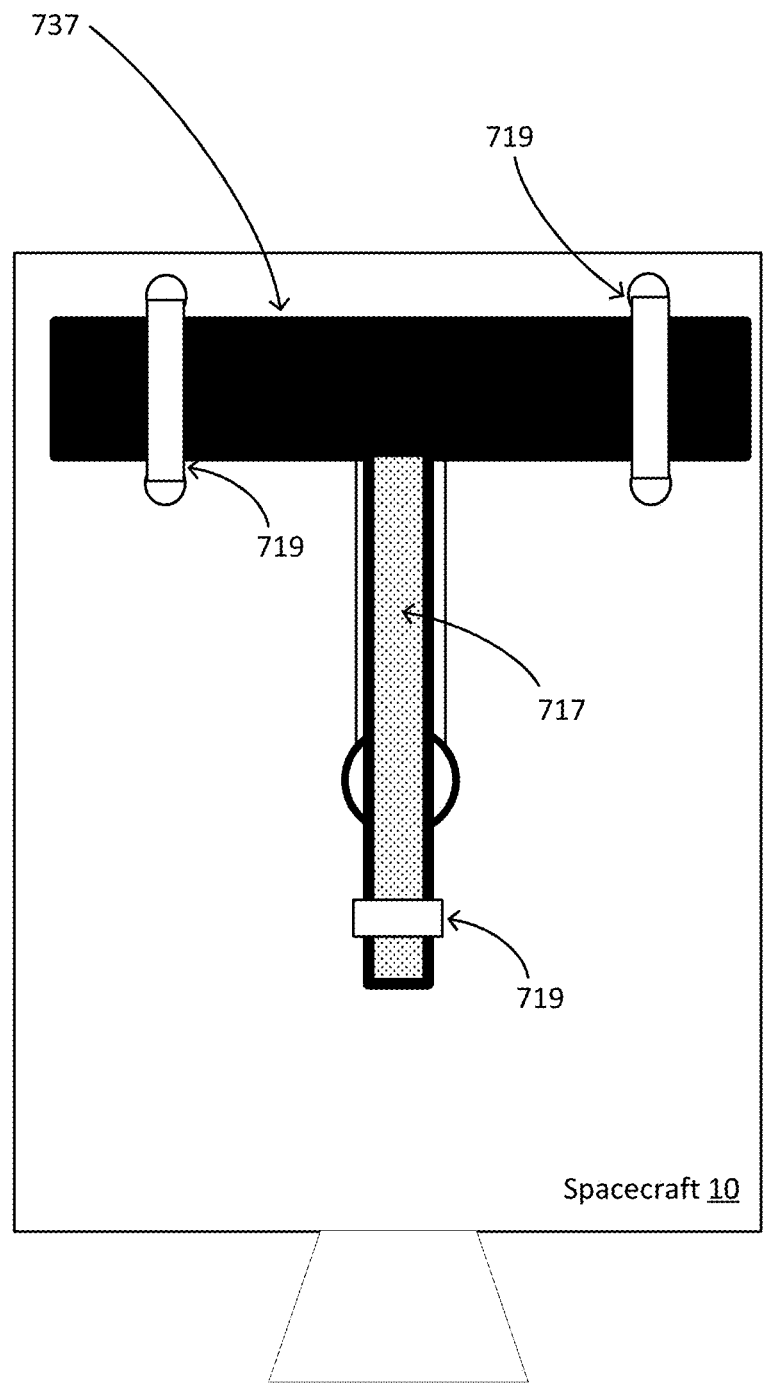
FIGS. 7 and 8 are side views of a stowed Z-fold flexible blanket solar array with two different orientations relative to the spacecraft.
Figure 8:
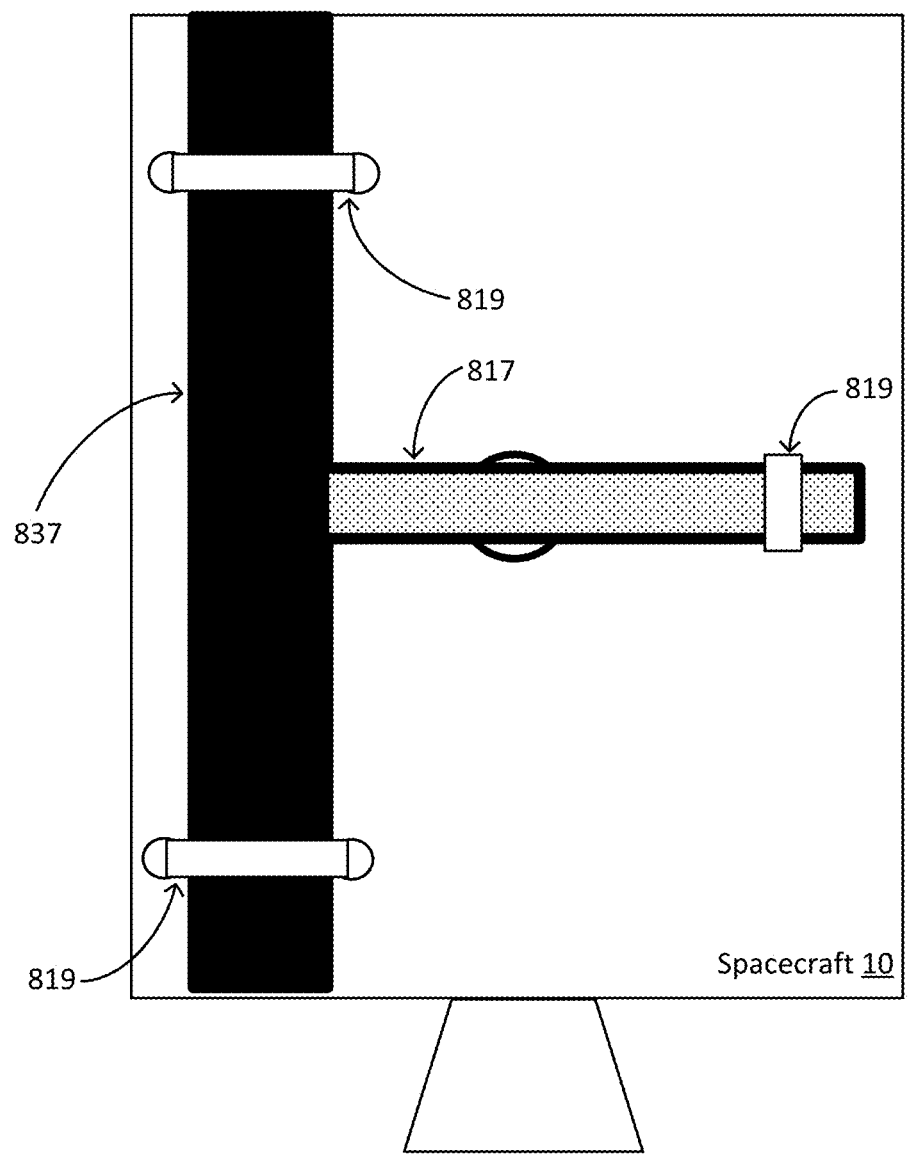

Returning to FIG. 5A, the stowed configuration for the Z-fold flexible blanket solar array (or other foldable array) structure 501 is shown. The Z-fold structure of the rigid T-structures 511 and 517 and the rigid beams 513 is collapsed and held in place by one or more hold-downs 519. Note that the solar cell array 537 of the outboard T-structure 517 is facing outward and can, consequently, provide power even when the structure is stowed. FIG. 5A only shows a single hold-down 519 around the bottom of the stowed structure, but other hold-downs could also be placed around the cross-member arms of the rigid T-structures 511 and 517 or other additional locations, such as is shown in FIGS. 7 and 8 below. The solar array blanket sections 521A and 521B are also Z-folded in an accordion manner as a set of pleats to form a pack of as shown at 521. The rigid beams 513 extend up between the blanket packs for solar array blanket sections 521A and 521B, so that in the view of FIG. 5A these are seen to overlay the rigid beams 513. Deployment of the solar array structure 501 initiates upon release of the hold-downs 519. Note that in FIG. 5A, as well as FIG. 5B, the blanket's back side (i.e., the side without the photovoltaic cells) is facing upward and the solar cell side is facing downward.

FIG. 5B illustrates the Z-fold flexible blanket solar array structure 501 at an intermediate point during deployment. The hinges 515 can include a graphite or other spring structure, such as represented at the sides of the hinge 515, to provide a spring driven synchronized deployment of the structure to extent the blanket to the flat position of FIG. 5C. The structural hinge-lines can be latched mechanically or magnetically before tensioning the blanket sections 521A and 521B, with the blanket tension then maintained by blanket spring tensioning.

FIG. 5D shows a side view of the deployed structure 501 where the sections of the solar array blanket 521 are oriented, as in FIGS. 5A and 5B, with the photovoltaic cells on the bottom side and the blanket backing to the top. The solar cell arrays 531 and 537 of the inboard and outboard T-structures 511 and 517 are also facing downward. The rigid beams 513 are connected by the hinges 515 and run between the solar array blanket sections 521A and 521B.

For the embodiment of FIGS. 5A-5D, as well as the other embodiments discussed below, to control the speed a viscous or other damper can be located where the T-shaped yoke structure 511 connects to the spacecraft's solar array drive assembly (such as incorporated into the mount 551), which the spacecraft 10 can use to rotate the Z-fold flexible blanket solar array structure 501 to face the sun. In one set of embodiments, the hinges 515 can be simple hinges, of the pin type, without need of mono-ball bearings and where the structure does not require offset springs by use of center mounting. In other embodiments, mono-ball bearings, offset springs, or both can be used. Simple latches or catches can be used to maintain the deployed position.

Figure 6A:
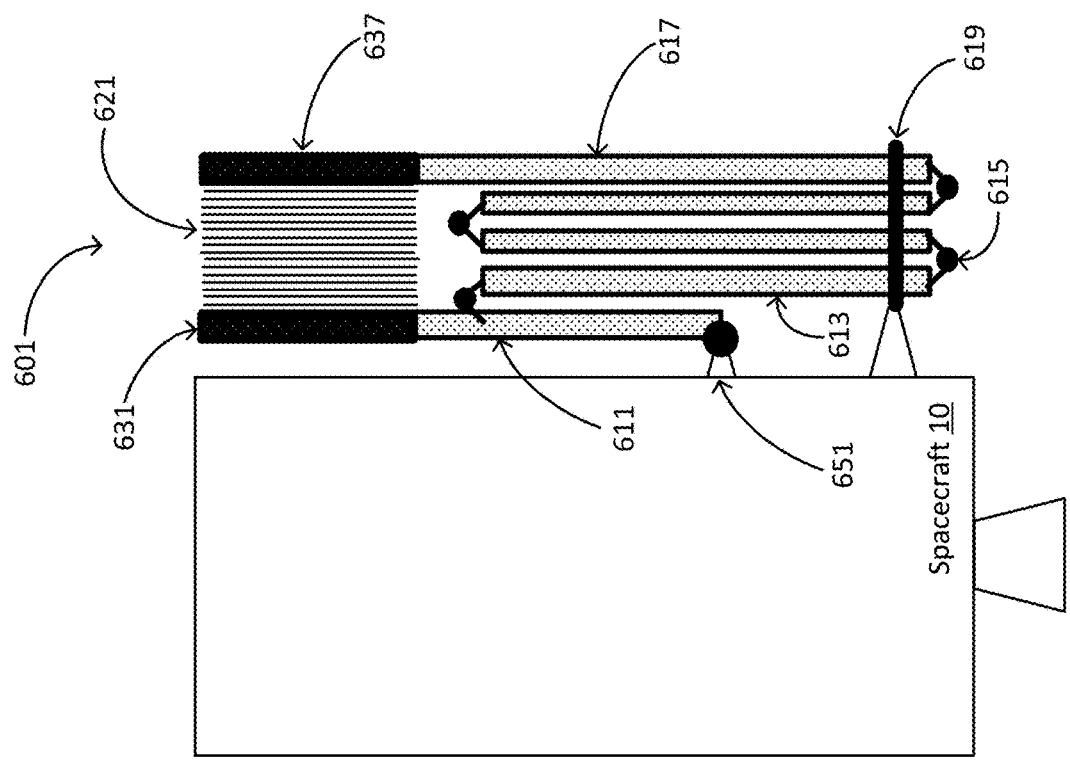

FIGS. 6A and 6B respectively illustrate the stowed and deployed Z-fold flexible blanket solar array (or other foldable array) structure 601 in an alternate embodiment having a one piece solar array blanket 621 and where the deploying structure is located behind (i.e., on the backside of) the solar array blanket 621 when deployed. Relative to FIGS. 5A and 5C, corresponding elements are similarly number: e.g., T-shaped yoke structure 511 is now 611, rigid beams 513 are now 613, and so on.

In the deployed view of FIG. 6B, the single piece solar array blanket 621 is again shown with the photovoltaic cells facing outward toward the viewer, but the support structure of including the rigid beams 613 are now on blanket side behind the solar array blanket 621. The outboard T-structure 617 can again be populated with a solar cell array 637 to provide stowed power and the inboard T-structure 611 can also be provided with a solar cell array 631. The closed cable loop can be inside of the deployment structure of the yoke T-structure 611, rigid beams 613, and the outboard T-structure 617, so as to not pinch the solar array blanket.

When stowed in a Z-fold, as shown in FIG. 6A, it can be seen that, relative to the embodiment of FIG. 5A, the rigid beams 613 are relatively shorter so that, when stowed, they do not extend upward to the blanket pack into which the solar array blanket 621 has been folded for stowing. The rigid beam 613 closest to the yoke T-structure 611 is now also attached below the stowed solar array blanket 621, so that when deployed the rigid beam 613 closest to the yoke T-structure 611 will partially lie below the yoke T-structure 611.

FIGS. 7 and 8 illustrates a side view of a spacecraft 10 with the Z-fold flexible blanket solar array or other foldable array in a stowed configuration. A spacecraft 10, such as a satellite will often be of a rectangular shape on its sides, such as being taller than wide in the examples of FIGS. 7 and 8. The stowed Z-fold flexible blanket solar array in a stowed configuration can be attached to the spacecraft with two orientations. Of the Z-fold flexible blanket solar array, the outboard T-yoke 717/817, including the solar cell array 737/837, can be seen in this view, with the rest of structure stowed behind. Three hold-downs 719/819 are shown in these embodiments, including a hold-down on the lower part of the base of the yoke T-structure 717/817 arranged as for the hold-down 517/617 of FIG. 5A/6A, and a hold-down on each of the arms.

The embodiments of FIGS. 7 and 8 have different relative advantages and the choice is a design decision based on the requirements of a particular spacecraft. The embodiment of FIG. 7 allows for a longer outboard T-yoke 717 and longer rigid beams (not visible in the view of FIG. 7), allowing for a greater extension when deployed for a given number of rigid beams. FIG. 8 allows for a wider longer outboard T-yoke 717 and, consequently, a wider flexible blanket solar array. The embodiment of FIG. 8 also allows for a larger solar cell array 837, and hence more power when stowed, than the solar cell array 737 of FIG. 7. It should be noted that in FIGS. 7 and 8, and the similar FIGS. 9A-9D, the elements may not be represented to scale relative to one another. For example, the size of the spacecraft may be several feet in either direction, while the width of the T-yoke structure only a few inches wide.

FIGS. 9A-9D present another embodiment for a Z-fold flexible blanket solar array that allows for a larger usable solar array when stowed. The embodiment of FIGS. 9A-9D can provide the spacecraft with roughly double the pre-deployment power capability by stowing two arrays side-by-side on a single yoke. The configuration of this embodiment uses a 90° rotation of the stowed blanket stacks to be perpendicular to the central member of the yoke and end structures prior to deployment.

Figure 9A:
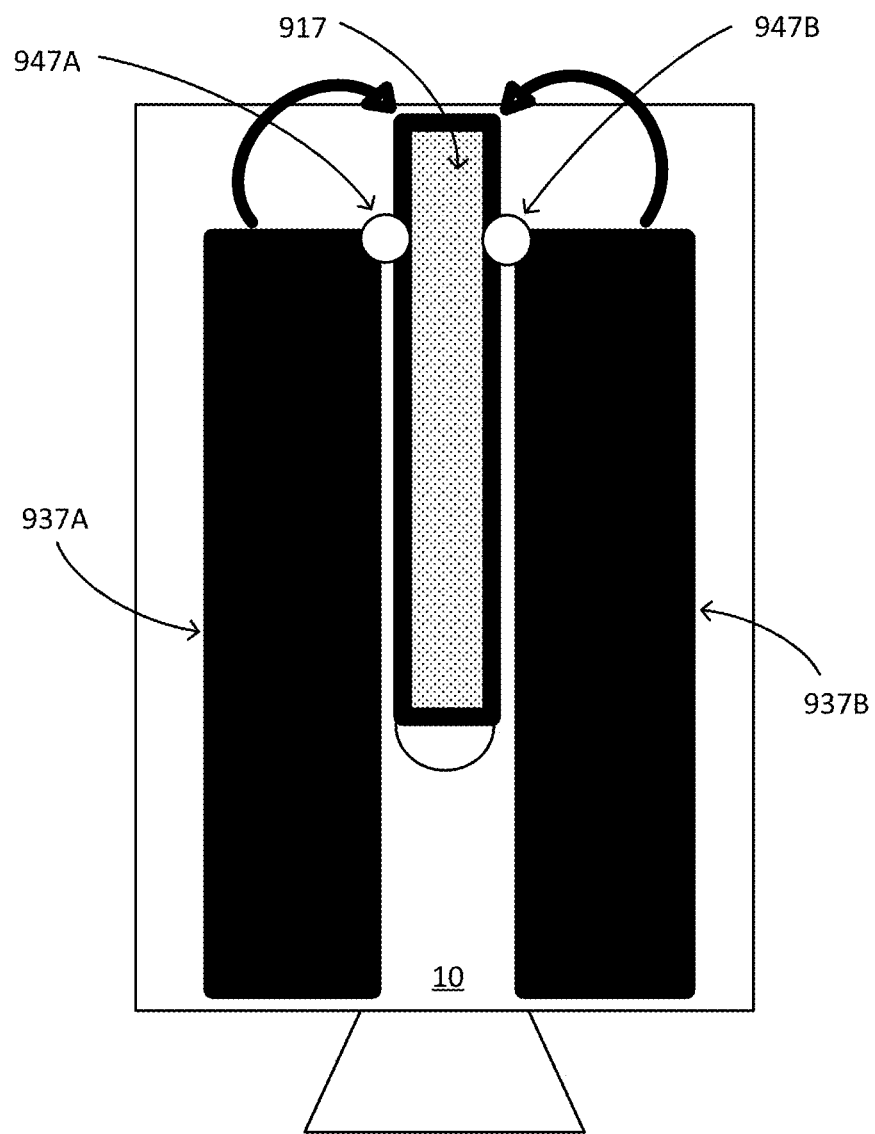
Figure 9B:
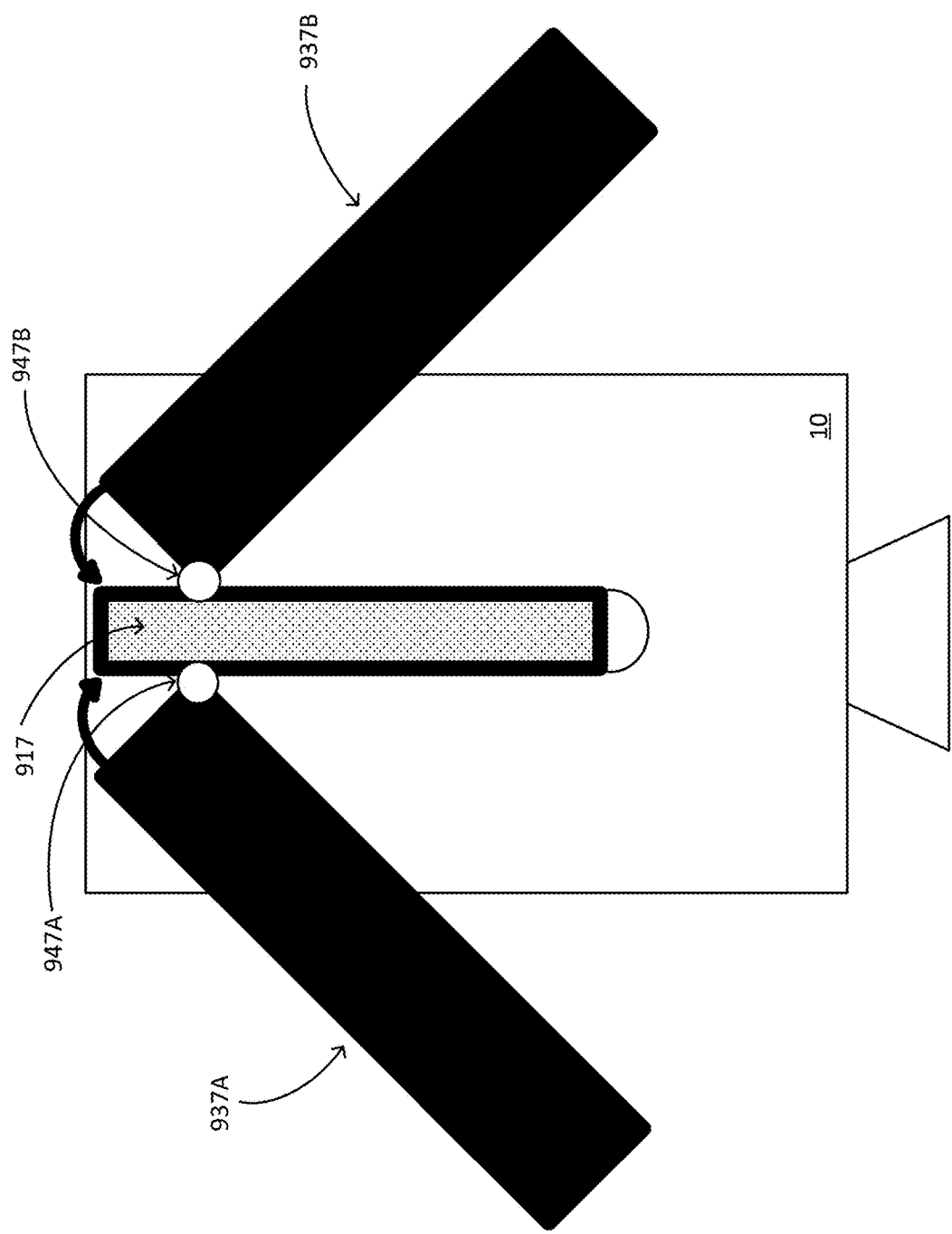

FIGS. 9A-9C respectively illustrate the Z-fold flexible blanket solar array with foldable arms in its initial stowed position, with the arms partially rotated, and fully rotated to form a T-structure. The view of FIG. 9A is the same as for FIG. 7 or 8, but hold-downs are not shown to simplify the presentation. Relative to FIG. 7, rather than for a fixed T-shaped structure, the top member of T-shaped yoke now includes two foldable sections covered with outward facing solar arrays 937A and 937B that rotate by use of respective hinges 947A and 947B. This provides for an increased available surface array for the solar arrays 937A and 937B, and consequently more available power, while still allowing for the structure to be stowed within the form-factor of the spacecraft 10. Once deployed, the resultant Z-fold flexible blanket solar array will also be wider, again resulting in more available power for a given length of structure. The two curved arrows FIGS. 9A and 9B are not part of the structure, but meant to indicate how the arms will rotate in an initial phase of the deployment process.

As for the hold-downs in the stowed configuration of FIG. 9A, a hold-down could again be placed on lower part (as seen in this review) of the central member 917 of the yoke section and a hold-down on the lower part of each of the folded arms with the outward facing solar arrays 937A and 937B. One or more additional hold-downs can also on the upper part of one or more of these elements. In one embodiment, the arms are first folded out, after which the structure can then be further deployed similarly to the embodiment of FIGS. 5A-5D. FIGS. 9A-9C illustrate this initial deployment phase.

Starting from FIG. 9A, the hold-downs for the arms 937A and 937B are released. Similar to the hinges 515 as discussed above, the hinges 947A and 947B can include a spring structure that will then cause the arms 937A and 937B to rotate outward at the bottom in the direction of the curved arrows. FIG. 9B shows an intermediate position where the arms 937A and 937B have partially rotated. In FIG. 9C the arms 937A and 937B have finished rotating and can be latched in place to the central member 917 of the yoke to complete the initial deployment phase and form a T-structure similar to that shown in FIG. 7, but with the top section of the T now extending beyond sides of the spacecraft 10. At this point, when viewed from the side (i.e., rotating the view by 90° about the vertical axis in the positive direction), the structure would appear as in FIG. 5A, although extending further into and out of the page. Once the side arms are latched in place by a mechanical or magnetic latch, for example, the structure can then complete the deployment process much as illustrated by FIG. 5B, where the resultant deployed Z-fold flexible blanket solar array 901 is shown in FIG. 9D.

Figure 9D:
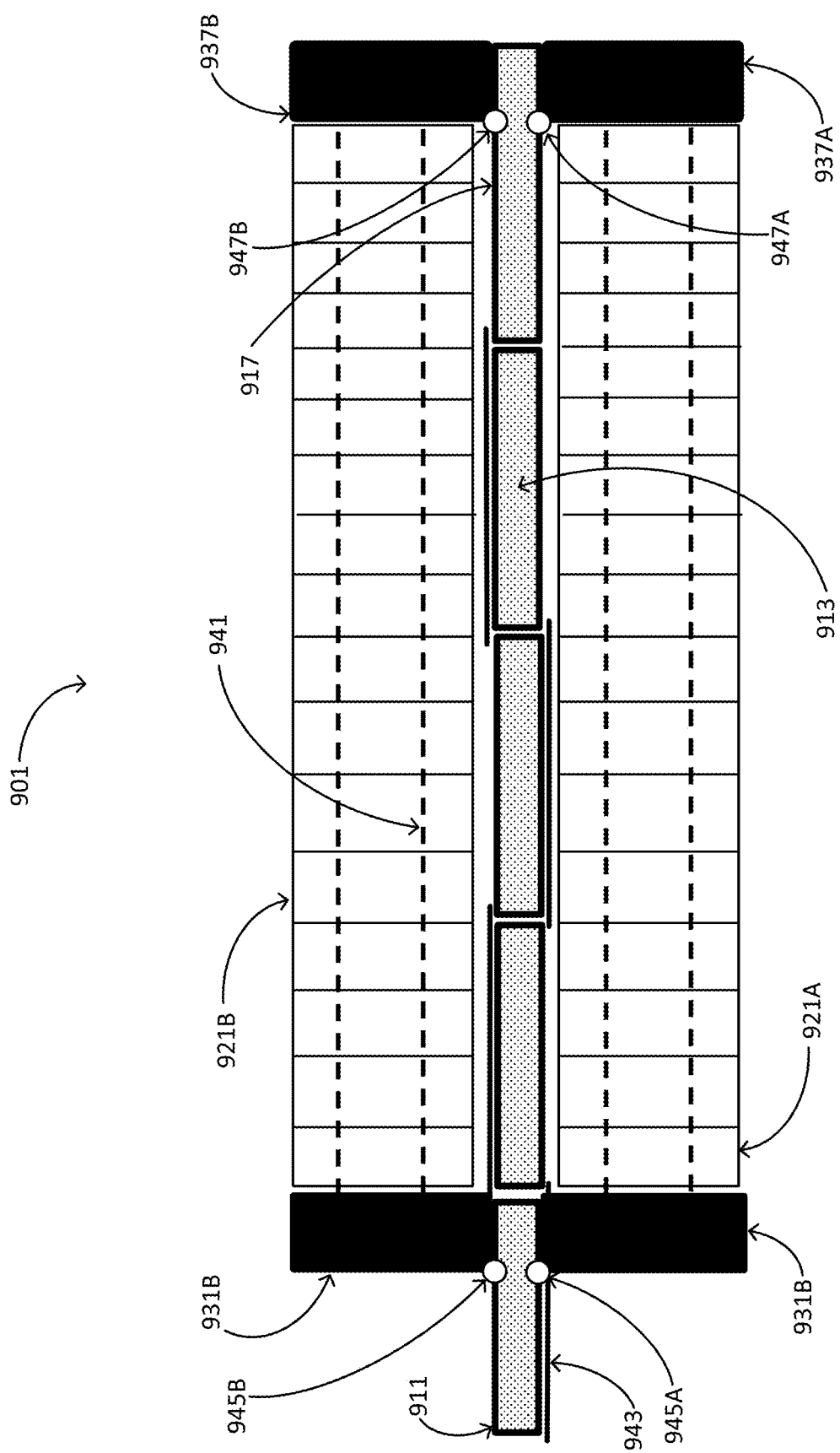

FIG. 9D shows the deployed configuration of an embodiment of the Z-fold flexible blanket solar array 901. The view of FIG. 9D is similar to that of FIG. 5D and the components are similarly number: i.e., rigid beams 513 are now 913, lower solar array blanket 521A is now 921A, and so on. Aside from the inboard and outboard T-structures, the Z-fold flexible blanket solar array 901 can be as described above with respect to the Z-fold flexible blanket solar array 501 of FIG. 5D. The outboard T-structure is now formed of a central member 917 and the two folding arms covered with solar arrays 937A and 937B and connected by the hinges 947A and 947B. Although not visible in the views of FIGS. 9A-9C, the yoke of the inboard T structure is similarly formed of a central member 911 and the two folding arms that can be covered with solar arrays 937A and 937B and connected by the hinges 947A and 947B, so that when stowed the arms of both the inboard and outboard T-structures are folded downward with the folded blanket packs for solar array blankets 921A and 921B stowed between them.

As with the embodiments of FIGS. 5A-5D and FIGS. 6A and 6B, the embodiment+ of FIGS. 9A-9D can again use a viscous or other damper to control the deployment speed can be located where the T-shaped yoke structure's central member 911 connects to the spacecraft's solar array drive assembly and embodiments for the hinges (both 945A/B and 947A/B, as well as the equivalent of 515) can again be simple hinges, of the pin type, without need of mono-ball bearings in a structure does not require offset springs by use of center mounting. In other embodiments, mono-ball bearing, offset springs, or both can be used for these hinges. Simple latches or catches can be used to maintain the deployed position. To deploy and keep in place the Z-fold flexible blanket solar array 901, a closed cable loop, that can include a concealed cable, can be used along with simple latches or catches without rollers. In some embodiments, the Z-fold flexible blanket solar array 901, as well as the other embodiments, can be motorized to be retractable.

Relative to the embodiments of FIGS. 5A-5D and FIGS. 6A and 6B, the use of the folded arms allows for a larger exposed surface area so that, by populating these with solar cells to form the arrays 937A and 937B, more power is available to the spacecraft when the blanket solar array 901 structure is stowed. The longer arms of the inboard and output T-structure also allow for wider solar array blankets 921A and 921B and, if populated with cells, longer solar arrays 931A/B and 937AB. In some embodiments, one or both of the central members 911 and 917 of the T-structures can also be populated with solar cells.

Figure 10:
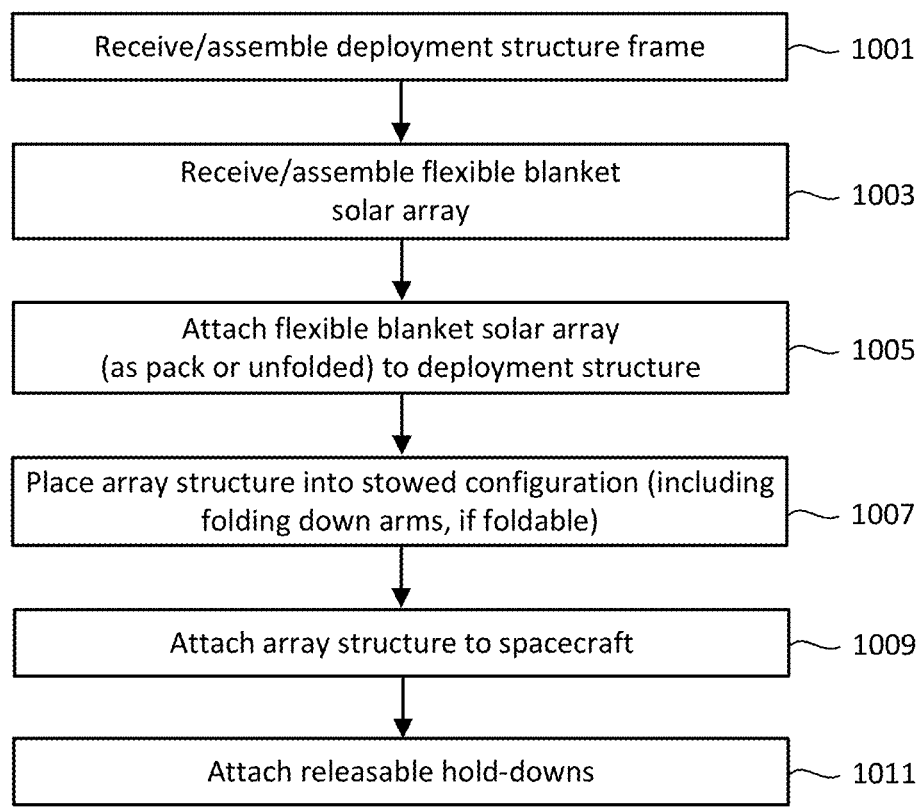
FIGS. 10 and 11 are flowcharts respectively describing embodiments for the stowing and the deploying of the Z-fold flexible blanket solar array structures.
Figure 11:
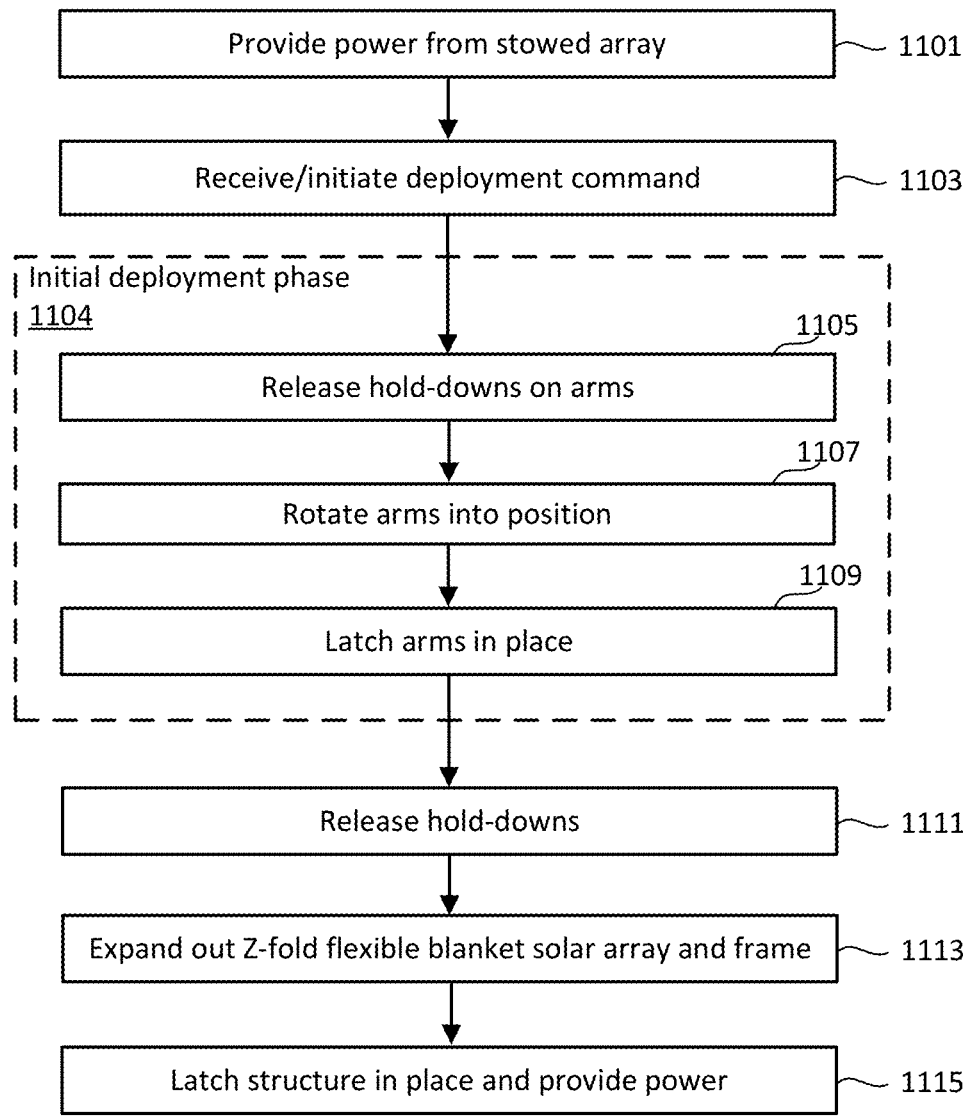

FIGS. 10 and 11 are flowcharts respectively describing embodiments for the stowing and the deploying of the Z-fold flexible blanket solar array structures. FIG. 10 begins at step 1001 with receiving, which can include the complete or partial construction, of the frame of the deployment structure including the T-shaped yoke structure (511/611/

911), the end T-shaped structure (517/617/917), the one or more rigid members (513/613/913), and the hinges (515/615 and 945A/B, 947A/B in the embodiment of FIGS. 9A-9D). At step 1003 the flexible blanket solar array is received, which can include the complete or partial construction of the flexible blanket solar array. Step 1003 can be performed before, after, or concurrently with step 1001.

The flexible blanket solar array is attached to the frame of the deployment structure at step 1005, with one end of the blanket or blankets being attached to the yoke cross-member arm of T-structure (511/611/911) and other end to the cross-member arm of the end T-structure (517/617/917). The blanket solar array can already be folded, or partially folded, in an accordion manner along its length to form a pack when attached, or can be folded after attachment, such as part of step 1007. The full structure (501/601/901) is then placed into its stowed configuration at step 1007 by folding up the frame of the deployment structure and, if not already done, the blanket solar array so that the blanket pack or packs are between the cross-arms of the T-structures (511/611/911) and (517/617/917). In an embodiment such as that of FIGS. 9A-9D, the arms of the T-structures would also be folded down into the arrangement shown in FIG. 9A.

In step 1009 the Z-fold flexible blanket solar array structure (501/601/901) is attached to the spacecraft 10 by bottom end of the central member of the yoke T-structure (511/611/911) as shown in the side views of FIG. 5A or 6A, for example. Depending on the embodiment, the flexible blanket solar array structure (501/601/901) can be attached after being placed into a stowed configuration at step 1007, or can be assembled or partially assembled (parts or all of steps 1001, 1005, or 1005) while attached and then placed into the stowed figuration, so that step 1009 could be performed at some point before step 1007. Once attached and in stowed configuration, releasable hold-downs (519/619/719/819) can be attached at step 1011 to hold the Z-fold flexible blanket solar array structure (501/601/901) in place until deployment.

FIG. 11 is a flowchart of an embodiment of the deployment process and begins once the spacecraft has been launched. Starting at step 1101, for embodiments that include photovoltaic solar cell arrays (527/637/737/837/937A,B) on the cross-arms of the outboard T-structure (517/617/717/817/917), the blanket solar array structure (501/601/901) can provide power prior to deployment. At step 1103, the control circuits on the spacecraft, such as the command and data handling sub-system (C&DH) 210, initiates a deployment command. This command can be received from a ground station or originate on the spacecraft itself, such as in response to a specified set of conditions.

For embodiments such as in FIGS. 9A-9D in which the horizontal arms fold down for stowing, as shown for the solar array populated arms 937A,B as shown in FIG. 9A, an initial deployment phase 1104 can be included. At step 1105 hold-downs for the arms are released, such as by pulling out of a pin by a servo or actuator. Once released, the solar array populated arms 937A,B begin to rotate about the hinges 947A,B from the position of FIG. 9A, through the position of 9B, and into the position of 9C at step 1107. The arms 931A,B will also rotate about the hinges 945A,B at the same time, although these are not visible in FIGS. 9A-9C as they are behind the end structure arms in these views, with the blanket packs stowed between them. The rotation can be effected by use of graphite or other spring structures incorporated into the structure of the hinges 945A,B and 947A,B or other automatic device or could incorporate a motor. The arms are then latched into place at step 1109, such as by mechanical or magnetic latches, where these could be incorporated into the hinges 945A,B and 947A,B, separate latches, or a combination of these.

At step 1111 the hold-downs (519/619/719/819) are released by the control circuits of the spacecraft, such as by pulling out of a pin by a servo or actuator, and the Z-fold flexible solar array blanket and frame begin to expand at step 1113, such as is illustrated in FIG. 5B. The expansion can be implemented by use of graphite or other spring structures incorporated into the structure of the hinges (515/615) or other automatic device or could incorporate a motor. As discussed above, simple hinges and a closed cable loop can be used to synchronize the deployment process and the speed can be controlled by used of a viscous or other damper can be located where the T-shaped yoke structure (511/611/911) connects to the spacecraft's solar array drive assembly. The guide line or string (541/641/911), that can extend from a retractable spool, for example, can be used to help tension the solar array blanket sections, both once deployed and also during step 1113. The structure is then latched into its deployed arrangement at 1115, such as by mechanical or magnetic latches, where these could be incorporated into the hinges (515/615), separate latches, or a combination of these. Once deployed, it can begin to provide power to the spacecraft, including being rotated or angled by the solar array drive assembly.

As noted above, in some embodiments the hinges 515/615 can incorporate a motor that can deploy and also re-stow (and subsequently re-deploy) the solar array. The ability to re-stow a solar array can be useful when a spacecraft is repositioned and can also be useful in other applications, such when a lunar rover or similar vehicle using such an array is moving. The following section considers embodiments with motorized hinges in more detail.

Figure 12:
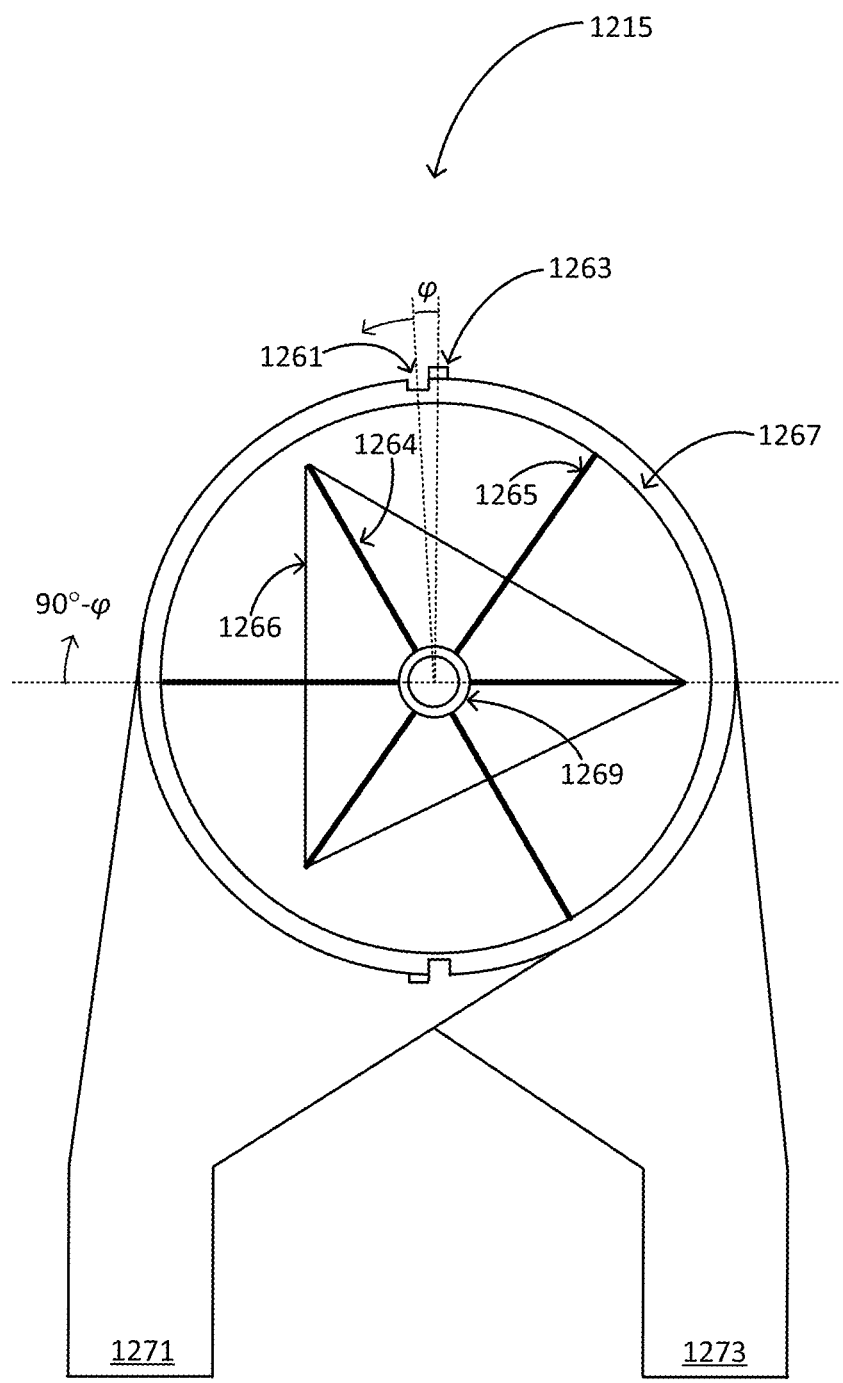
FIG. 12 is a side view of an embodiment for a motorized large angle flexure pivot hinge that can be used in the frame structure for z-fold flexible blanket solar array structures.

FIG. 12 is a side view of an embodiment for a motorized large angle flexure pivot hinge 1215 that can be used in the frame structure for the Z-fold flexible blanket solar array structures presented here. The motorized flexure hinge 1215 includes a pair of lugs or legs 1271 and 1273 that can mount directly to corresponding frame members and that are each mounted to a central pivot portion, with the leg 1271 attached to the outer rim 1267 and the leg 1273 attached to an inner rim that is behind the outer rim 1267 (shown as inner rim 1287 in the view of FIG. 13). The outer rim 1267 is attached to an outer center hub 1269 at center by "leaf spring" spokes 1265 or other flexure elements that flex as the hinge pivots. Alternating with the longer flexures 1265 are shorter "leaf spring" flexures 1264 that are connected to the outer center hub, but, rather than extend all the way to the outer rim 1267, the flexures 1264 are shorter and attach at their outer ends to a triangular piece 1267. The motorized large angle flexure pivot hinge 1215 can also incorporate a retractable latch structure that, in the shown embodiment, includes a bimetallic latch arm 1263 that is mounted on the outer rim 1267 and extends into the page toward the inner rim 1287 (FIG. 13) and is adjacent to a notch 1261 in the outer rim 1267. The inner part of the motorized flexure hinge can be similarly structured, aside from the bimetallic latch arm 1263. The motorized flexure hinge 1215 structures are mounted in pairs coaxially through shorter half of the "leaf spring" flexures 1264 at the distal end, near the rim 1267, so that the triangular structure is between inner and outer parts and attached to the shorter flexures 1264 to either side. (More detail on an embodiment for the flexure pivot, but not including the retractable latch structure such as the bimetallic latch arm 1263 arrangement, is Spanoudakis et al., "Large Angle Flexure Pivot Development for Future Science Payloads", in the *Proceedings of the 18th European Space Mechanisms and Tribiology Symposium* 2019, which is incorporated by reference herein.)

The rim notch 1261 and bimetallic latch arm 1263 are offset radially along the outer rim 1267 by an angle φ, where, depending on the embodiment, this could be in the range of 0°-20° (e.g., 8°). The embodiment of FIG. 12 has two rim notch 1261/bimetallic latch arm 1263 pairs offset by 180°. When the motorized flexure hinge 1215 pivots, the outer rim 1267 and leg 1271 rotate clockwise and the inner rim 1287 and leg 1273 rotates counter-clockwise relative to each other. Once the rims have undergone relative rotations of ±(90°-φ), the bimetallic latch arms 1263 on the outer rim 1267 will align with the notches on the inner. The bimetallic arms can passively latch the motorized flexure hinge 1215 by use of stored strain energy into a deployed position with a relative angle of (180°-2φ) between the legs 1271 and 1273. This can be illustrated with reference to FIG. 13.

The motorized flexure hinges 1215 can use double gear reduction motors to provide high torque that can be used to tension the solar array blanket. The motorized flexure hinges 1215 hinge can be used not only to stow and deploy the array, but also on the deployment stroke to provide a tensioning force, reducing or eliminating the need of a separate release and tensioning mechanism, saving on costs, mass, and integration time and reducing risk due to potential lack of function on-orbit. To provide and assist with tensioning in such an arrangement, the solar array blanket can have a degree of elasticity allowing it to stretch in the direction of the deployment. The frame structure can be engineered so that its deployed length would be somewhat longer (such as a few inches) that the solar array blanket's relaxed length. The blanket would be configured to have elasticity such that it would be sufficiently compliant itself, include a string of compliance (a bungee cord type of structure), or a combination of these such that when stretched the solar array blanket can achieve the desired blanket tension, resulting in the compliant spring displacement to ensure tension (such as a few inches) is maintained throughout the orbit with changing temperatures on the structure and blanket.

Figure 13:
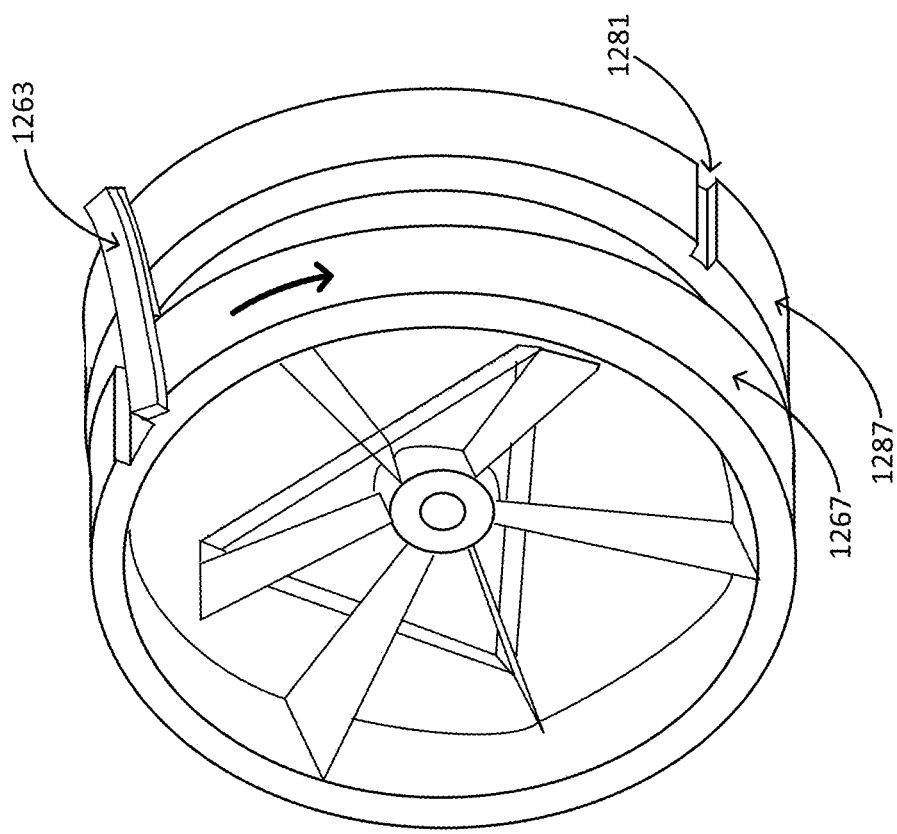
FIG. 13 is an oblique view of the motorized flexure hinge showing the features of FIG. 12 and also the inner rim.

FIG. 13 is an oblique view of the motorized flexure hinge 1215 showing the features of FIG. 12 and also the inner rim 1287, but without legs 1271 and 1273 attaching the rims to the frame structure. Legs 1271 and 1273 aside, the features of FIG. 12 are repeated for the outer section, but with only the rim 1267 and bimetallic latch arm 1263 explicitly numbered. The motor for rotating the outer rim 1267 relative to the inner rim 1287 is within the structure and not visible in the figures. For the inner section, a portion of the inner rim 1287 is visible in FIG. 13 and includes one of its notches 1281. FIG. 13 shows the structure in an intermediate state between stowed and deployed when the outer rim 1267 has rotated relative to the inner rim 1287 by around 30° in the direction of the arrow. The bimetallic latch arm 1263 is, depending on the embodiment, actively raised from or gliding along the outer surface of the inner rim 1287. Once the inner rim 1287 and outer rim 1267 have rotated through a relative angle of (180°-2φ), the bimetallic latch arm 1263 will be over, and can be lower or snap down into the notch 1281 to engage the latch and notch to latch the frame structure into its deployed position. A similar bimetallic latch arm 1263 and notch 1281 on the other side can similarly engage.

The motorized flexure hinge 1215 can be formed in a number of ways, depending on the embodiment. For example, an additively manufactured parts can be manufactured through use of Electrical Discharge Machining (EDM) to create the hinges. In other embodiments, a 3D printed hinge can be manufactured from a reinforced nylon or many other materials as one assembly, including the lugs or legs 1271 and 1273, which can be bonded directly into the frame member tubes to minimize parts and fasteners.

Although in the of embodiments of FIGS. 12 and 13 the element 1263 has been referred to as a bimetallic latch arm 1263, in other embodiments it could just be a passively flexed member that would latch into place once the notch 1281 is aligned with the member 1263. However, the use of a bimetallic latch arm is one embodiment of a mechanism that allows for the latch to be released, allowing the deployed structure to be released and folded back up. This is illustrated with respect to FIGS. 14A and 14B.

Figure 14B:
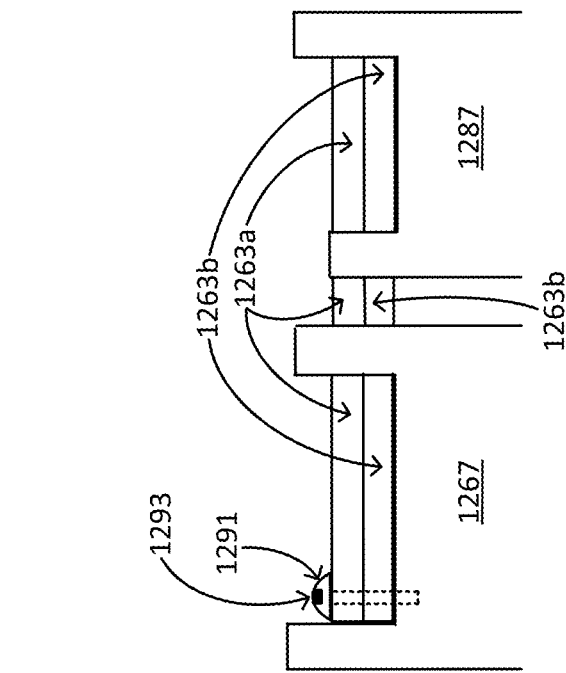
FIGS. 14A and 14B respectively illustrate a bimetallic latch arm in a released state and a latched state.
Figure 14A:
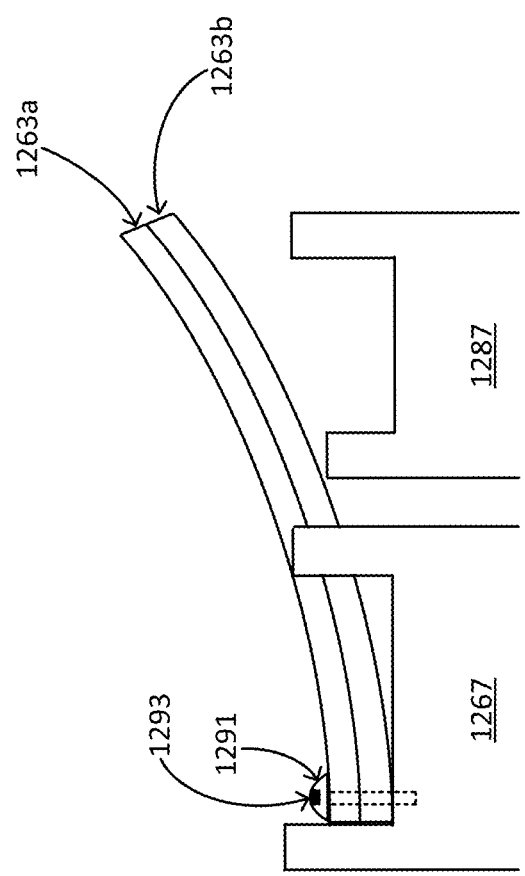

FIGS. 14A and 14B respectively illustrate a bimetallic latch arm 1263 in a released state and a latched state. In the embodiments presented here, the latched state of FIG. 14B corresponds to the relaxed state where the bimetallic latch arm 1263 is at or relatively near the ambient temperature and FIG. 14A corresponds to the active state when the arm is arced into a released configuration, but alternate embodiments could reverse these.

The bimetallic latch arm 1263 is formed of a pair of metal strips 1263*a* and 1263*b* with differing coefficients of heat expansion. Because of this, depending on the temperature of the bimetallic latch arm 1263, its curvature will vary. On the one end, the bimetallic latch arm 1263 is attached to the outer rim 1267 by a bolt, rivet, or similar attachment device 1291 so that it is held fixed on the one end, but allowed to flex along the length of the bimetallic latch arm 1263. The attachment 1291 is made of a material that can conduct heat to the pair of metal strips 1263*a* and 1263*b* and can include a heating element 1293. When at or near the ambient temperature, both of metal strips 1263*a* and 1263*b* are of the same or near the same length, so the bimetallic latch arm 1263 is straight or near straight so that it extends from the outer rim 1267 into the notch of the inner rim 1287 to latch the structure into the deployed configuration of FIG. 14B. In alternate embodiments, the bimetallic latch arm 1263 could be attached to the inner rim 1287 and latch into the outer rim 1267.

When the heating element 1293 is activated, such as by applying a current, to heat the bimetallic latch arm 1263 to, for example, in a range of 225-500 C, the bimetallic latch arm 1263 will arch upward as illustrated in FIG. 14A so that the Z-fold flexible blanket solar array frame can be re-stowed by the motorized flexure hinge 1215, folding the structure back into a configuration such as shown in FIG. 5A or 6A. Once the motorized flexure hinge 1215 rotates the outer rim 1267 relative the inner rim 1287 enough so that the bimetallic latch arm 1263 is no longer is aligned with the notch, the bimetallic latch arm 1263 can either be maintained in an arched configuration or allowed to relax and rest upon the inner rim, where this is a choice between the energy to maintain the bimetallic latch arm 1263 in the flexed state and energy needed to overcome the friction of the bimetallic latch arm 1263 on the inner rim 1287. As the inner rim may of a material (e.g., a nylon material) of relatively low drag coefficient, the bimetallic latch arm 1263 can often just be relaxed and the motorized flexure hinge 1215 be allowed to return to its stowed position. Similarly, when deploying the structure, the motorized flexure hinge 1215 can glide along the inner rim 1287 until it latches in the notch 1281 or be flexed until these align and then be relaxed.

The use of a flexible bimetallic strip latch arm 1263 that passively latches upon deployment by falling into a groove or notch 1281 like a keyway, and that lifts out of the groove when current is applied to a heating element 1293 affixed to the bimetallic latch arm 1263, can be an effective embodiment for a retractable latch structure. The same controller as the motor control board used to power and control the motorized flexure hinges 1215 can also be used to apply current to the heating element 1293. The bimetallic latch arm 1263 can be designed to not deflect out of the locking notch 1281 through temperature variations experienced on-orbit and only release when a current is applied to the heating element 1293 so that it has a sufficiently greater temperature than would be experienced on-orbit. The deflected bimetallic strip latch arm 1263 of FIG. 14A could raise high enough to land on a ramp, in some embodiments, which would fully un-latch upon rotating the hinge with the motor.

As discussed above, as the notch 1281 and arm bimetallic latch arm 1263 can be offset by radial angle φ on the outer rim and inner rim 1287, when latched into place the yokes and intermediate members will not be flat, but rather at an obtuse angle of (180°-2φ). As the solar array blanket or blankets are only connected at the ends to the yoke structures, but not the intermediate frame members, the solar array blanker or blankets can still be flat, and the frame used to tension the blanket or blankets. This can be illustrated with respect to FIGS. 15 and 16.

Figure 15:
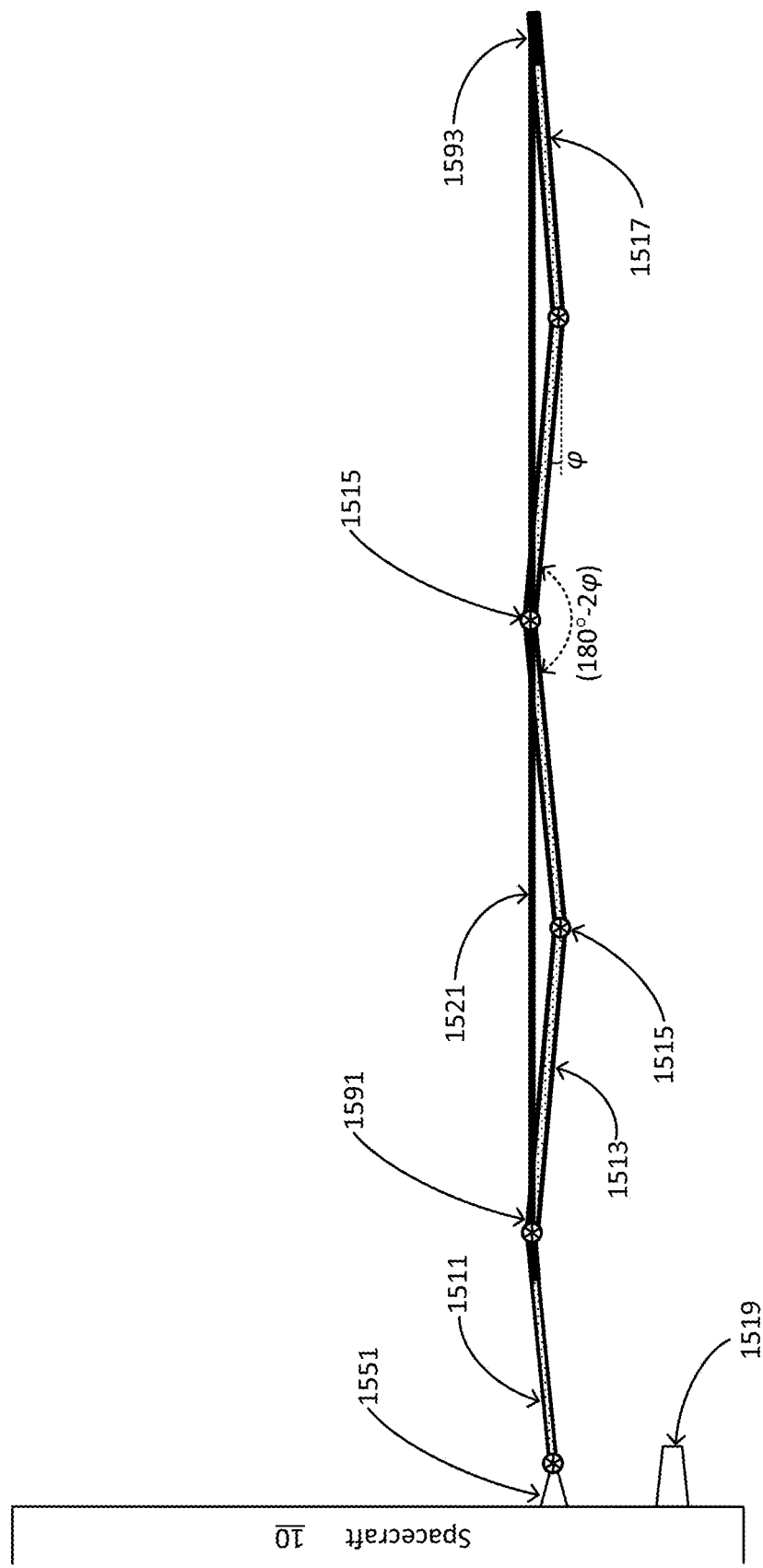
FIGS. 15 and 16 illustrate an embodiment for a deployed z-fold flexible blanket solar array structure in which the yokes and intermediate members are at less than 180° when latched in a deployed configuration.
Figure 16:
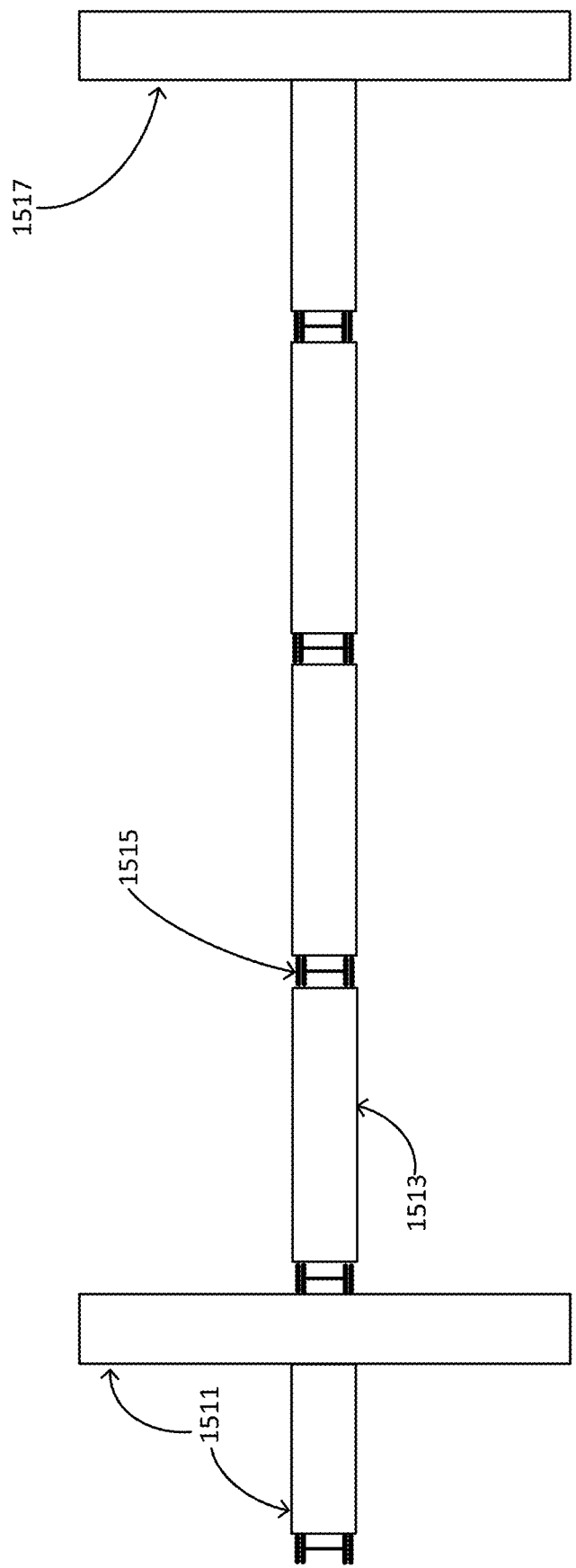

FIGS. 15 and 16 illustrate an embodiment for a deployed Z-fold flexible blanket solar array structure in which the yokes and intermediate members are at less than 180° when latched in a deployed configuration. FIG. 15 again shows the Z-fold flexible blanket solar array structure attached to a spacecraft 10, but it could also be mounted to other hosts to provide power, such as to a lunar rover or other vehicle. The inboard T-yoke 1511 is attached to the mount 1551, with one or more (three in this example) intermediate members 1513 connected between the inboard T-yoke 1511 and the outboard T-yoke 1517. In this embodiment the inboard T-yoke 1511, intermediate members 1513, and outboard T-yoke 1517 members of the frame are connected by motorized flexure hinges 1515, such as described with respect to FIGS. 12, 13, 14A, and 14B. In alternate embodiments, non-motorized hinges as described with respect to earlier embodiments can be used for the hinges and can, for example, include a spring to deploy the structure, but the use of motorized hinges and retractable latches allow for the structure to be re-stowed. Although not noted in FIG. 15, the structure can again include solar arrays mounted on one or both of the inboard T-yoke 1511 and the outboard T-yoke 1517.

One or more blanket solar arrays 1521 are stretched between the inboard T-yoke 1511, where one end is attached at 1591, and outboard T-yoke 1517, where the other end is attached at 1593, but where the one or more blanket solar arrays 1521 are not attached to the intermediate members 1513. Relative to FIG. 5D, rather the different frame members connecting at 180° when deployed, they are at an angle φ relative to the horizontal (as represented in FIG. 15) so that the angle between the members is the obtuse angle of (180°-2φ) where, in this embodiment, φ could be in the range of 0°-20° (e.g., 8°). When viewed from above, the deployed structure of FIG. 15 would appear as in FIG. 5C for a two blanket embodiment, with a blanket to either side of the central frame member, or as in FIG. 6B for a single blanket embodiment. When stowed, these two embodiments would be similar to FIG. 5A or 6A and held in place by hold-down 1519 and could again incorporate folding arms as illustrated with respect to FIGS. 9A-9D. When at an intermediate state while extending from the stowed configuration to the deployed configuration (or being folded up to be re-stowed), the structure of FIG. 15 would be similar to the representation of FIG. 5B, but where the deployment would latch into place in the configuration of FIG. 15 rather than a full 180°.

As noted above, the solar array blanket 1521 can be configured to have a degree of elasticity, allowing it to stretch by, perhaps, a few inches in order to provide tensioning. By not deploying frame members to a full 180°, the motorized flexure hinges 1515 can use their motor torque to translate the extension into blanket tension. The amount of torque from the motorized flexure hinges 1515 will typically decrease in a somewhat sinusoidal manner near 180°, so that it in some embodiments it can be preferable for the frame to be extended somewhat less than 180°.

The embodiment of FIG. 15, where the frame members (inboard T-yoke 1511, intermediate members 1513, and outboard T-yoke 1517) are relatively inclined at an angle of less than 180° (e.g., obtuse angles between 170° and 160°), can hold the deployed solar array blanket or blankets 1521 stretched taut between the mounting points 1591 and 1593. The frame members in this configuration can have the ability to flex to some degree, so that solar array blanket or blankets 1521 can be kept stretched taut as they expand or contract based on conditions such as the degree of exposure to the sun.

The frame members (inboard T-yoke 1511, intermediate members 1513, and outboard T-yoke 1517) of FIG. 15 can again formed of hollow graphite rectangular tubes with dimensions of a few inches and a wall thickness of 10s of mils or of other beam shapes (e.g., I-beam, round or oval cross-sections). For embodiments that require additional rigidity, such for larger arrays, the frame members can use a bean architecture in which the beams are wider in the horizontal directions, as illustrate in FIG. 16.

FIG. 16 is a top view of the embodiment of FIG. 15 when inboard T-yoke 1511, intermediate members 1513, and outboard T-yoke 1517 use a rectangular beam structure, but with the solar blanket or blankets and any yoke mounted solar arrays not shown. Each of the frame members in this embodiment have a rectangular cross-section that wider in the horizontal directions of FIG. 16 (i.e., the plane of the deployed solar array blanket) then in the direction into the page (i.e., the side view of FIG. 15). Each of the individual beams can again be formed of hollow graphite rectangular tubes and have a cross-section with an aspect ratio of 3-4 to 1, for examples, such 6-10 inches wide and −1-2 inches thick, with the sizes selected for a given embodiment depend on the requirements of the application. The frame members are attached to one another and to the spacecraft, vehicle, or other device by a pair of coaxially mounted motorized flexure hinges 1515, where one of the pair are attached to one of the beam pairs on either side and are connected to each other an axle. Alternate embodiments can use other hinge structures and the dual beam frame member structure can be used for the "straight" embodiments such as described with respect to FIGS. 5A-5D or FIG. 6A-6B. In other alternate embodiments, the structures described with respect to FIGS. 15 and 16 can also incorporate fold down arms as in FIGS. 9A-9C.

The embodiments described with respect to FIGS. 12-16 can have a number further advantages over prior art arrangements, including the ability to re-stow the array, a property that can be useful, for example, to the lunar rover or similar vehicle that has the requirement to be driven around, where the array can be deployed to charge up the host and then re-stowed to drive around again. By having a deployed state in which the frame members are not flat (i.e., not 180°), the frame structure of FIGS. 15 and 16 provide the ability to tension the solar array blanket without need of a separate mechanism made up of release devices and tensioning devices. The structure can leverage the high torque of motors of the motorized flexure hinges 1515 to generate tensioning force in the solar array blanket, eliminating the two separate passive mechanisms of a release device and tensioning springs. By having the frame structure able to deploy further than the solar array blanket's length, by a few inches for example, and providing the solar array blankets to include a "lower-stiffness" spring, the force generated by the differential length can help to ensure through various parts of an orbit and associated temperatures changes that the frame structure maintains tension on the solar array blanket.

The rigidity of the deployed Z-fold flexible blanket solar array structure can also provide the gimbal control electronics 218 with the ability to adjust the solar array angle as attached at a solar array drive assembly within the mount 1551 to allow for roll-steering the space craft for coverage or fine tuning the solar array orientation for various parts of the orbit to maximize the cell efficiency. Such roll-steering can be useful for the spacecraft with changing coverage areas. The rigidity of the frame structure can similarly provide the ability to adjust for solar pressure differentials between the wings of a two-array embodiment (as at 265 of FIGS. 3 and 4) to reduce the need for expending valuable propellants for station keeping.

Figure 17:
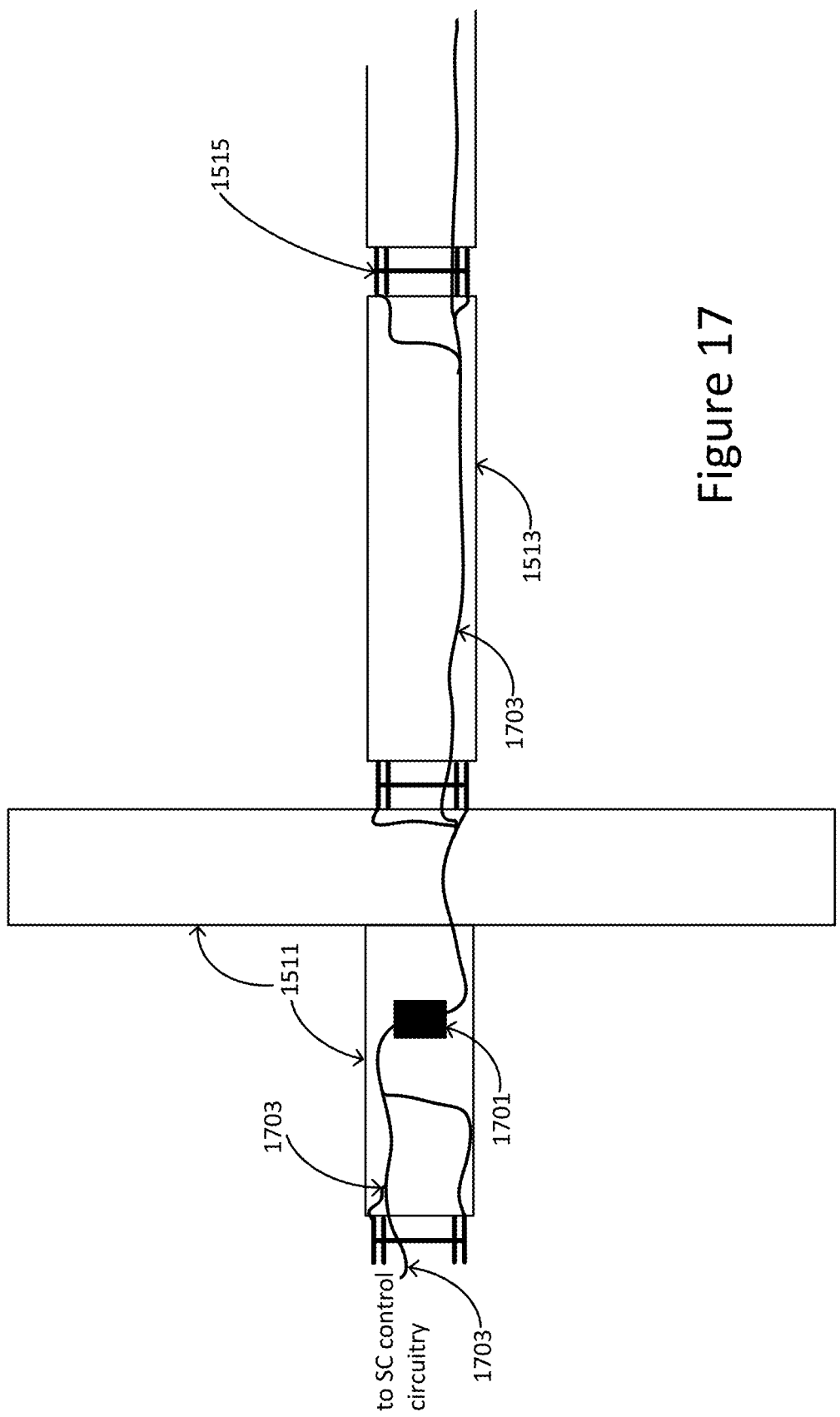
FIG. 17 illustrates an embodiment for the locating of the controller and wiring for the motorized flexure hinges and releasable latches.

The control circuitry for the Z-fold flexible blanket solar array structure, for one or both of the motorized flexure hinges 1515 and the heating element 1293 of the metal strips 1263a and 1263b can be part of the spacecraft's (or other host's) control circuit; be on the solar array structure; or a combination of these. Moving the control circuitry to the frame structure can have a number of advantages as this can allow for the individual control signals to be generated on the array structure, reducing the amount of wiring and also simplifying the interaction with the spacecraft so that individual spacecrafts control circuitry need not account for differences in array structures (i.e., differing numbers or types of motorized flexure hinges 1515 or retractable latch structures). FIG. 17 illustrates one such embodiment.

FIG. 17 illustrates an embodiment for the locating of the controller and wiring for the motorized flexure hinges and releasable latches. The control circuitry for the array controller 1701 is located on the frame of the Z-fold flexible blanket solar array structure. In the embodiment of FIG. 17, the system controller 1701 is mounted on the inner yoke 1511, but other placements can be used. The system controller 1701 is connected to a wiring harness or harnesses 1703 that can be used to provide control signals to the motorized flexure hinges 1515 including retractable latch structures through a minimal number of slip rings in the solar array drive assembly (SADA) in the mount 1551. The wiring harness also connects the on-array system controller to the control circuitry of the spacecraft, lunar rover, or other host on which the solar array structure is mounted. The communication between the host to the Z-fold flexible blanket solar array structure's on-array system controller 1701 can be as simple as signals to deploy and re-stow, along with confirmations, with the system controller 1701 converting these to the appropriate number and type of signals to supply to the motorized flexure hinges 1515 and heating element 1293 or other retractable latch structure release mechanism.

The Z-fold flexible blanket solar array structure embodiments of FIGS. 12-17 can operate as described above with respect to FIGS. 10 and 11 for the stowing and deploying of the solar array. Additionally, following deployment at steps 1113 and 1115, the structure can be restowed and subsequently redeployed, as described with respect to FIG. 18.

Figure 18:
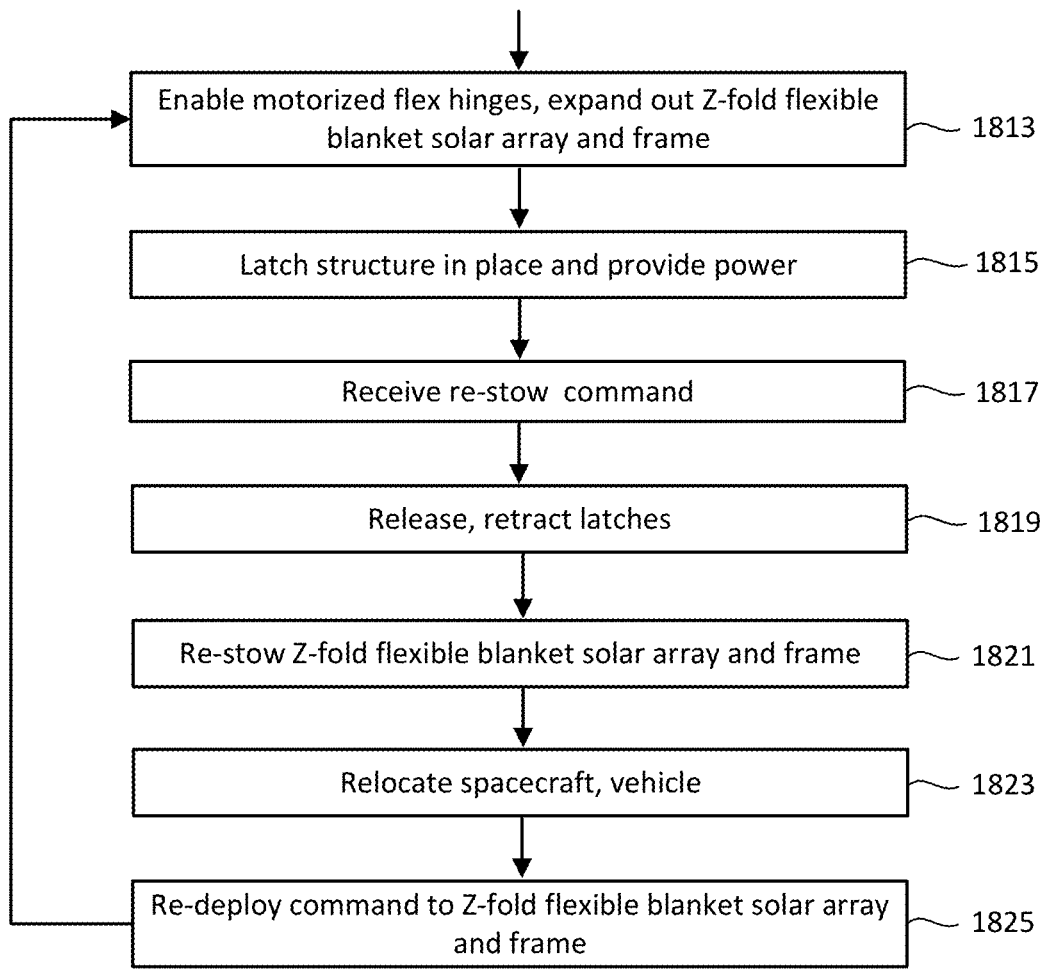
FIG. 18 is a flowchart for an embodiment of a method of operating a retractable Z-fold flexible blanket solar array structure.

FIG. 18 is a flowchart of an embodiment for a method of operating a retractable Z-fold flexible blanket solar array structure. FIG. 18 picks up the flow at steps 1813 and 1815, which can correspond to step 1113 and 1115 of FIG. 11. If the flow of FIG. 18 is the initial deployment, or the hold-downs have been reattached, the hold-downs are released prior to step 1813. Additionally, if the embodiment includes foldable arms, these can have been deployed (or redeployed) prior to step 1813 in an initial deployment phase.

At step 1813, in response to control signals from on-array controller 1701, which are in turn in response to a deploy signal from the spacecraft 10 or other host, the motorized flexure hinges 1515 are enabled and the Z-fold flexible blanket solar array structure expanded out to its deployed configuration. If the latches are set when in the stowed configuration, the latches are also released at step 1813. Once the frame has expanded into the deployed configuration, it is latched in place as step 1815, such as by the bimetallic strip 1263 slotting in the notch 1281 on the rims of the motorized flexure hinge 1215. In the deployed configuration, the solar array blanket can then provide power to the spacecraft 10 or other host.

At some later time, the spacecraft, lunar rover, or other apparatus using the solar array structure issues a stow command to the Z-fold flexible blanket solar array structure at step 1817. The re-stow command can be received at the on-array system controller 1701 that can issue release commands to the latches and then activate the motorized flexure hinge 1215. At step 1819 the retractable latch structures are release, such as by applying a current to the heating element 1293 of the bimetallic strip 1263 to heat the bimetallic strip 1263, allowing it to release. Once the latches are released, the motorized flexure hinge 1215 fold up the Z-fold flexible blanket solar array structure to re-stow it at step 1811. Depending on the embodiment, the bimetallic strips 1263 can be maintained in a flexed state while the Z-fold flexible blanket solar array structure is folded up or they can be relaxed once the motorized flexure hinges 1215 rotate sufficiently so that the bimetallic strips 1263 are clear of the notches 1281. Depending on the embodiment, once folded up the solar array structure can be reattached to the hold-downs 1519; held in place by additional notches like 1281, but located to hold the structure in the stowed configuration; held in place by the motorized flexure hinge 1215; or a combination of these. If the structure also includes foldable arms, such as illustrated in FIGS. 9A-9D, these can also either be left extended or also folded up in step 1821.

Once the Z-fold flexible blanket solar array structure is re-stowed, the spacecraft, lunar rover, or other hosting apparatus can be relocated at step 1823 without worrying about the solar array structure being damaged as easily or inhibiting movement. Once the movement is finished or power is need, the Z-fold flexible blanket solar array structure can be redeployed by sending a command to the on-array structure controller 1701 at step 1825 and the flow can loop back to step 1813 for deployment.

The embodiments presented so far have largely been based on flexible blanket solar arrays, although alternate embodiments based on panels were also presented. The following discussion considers panel based embodiments in more detail. More specifically, a set of solar panels are hinged to fold into a compact package when stowed, but extend out similarly to the flexible blanket. The panels have a curvature in the axial direction when in a relaxed state in order to provide rigidity when stored, but can be stretched flat when deployed in order more efficiently capture sunlight. This allows for the array structure to be stiff during launch, but still have low mass.

In a typical solar panel, the cell substrate needs to be stiff in the out-of-plane direction to survive launch vibrations, requiring a considerable thickness that results in greater mass. An alternative is to use a cylindrical thinner rigid panels to gain stiffness, but, due to the non-flat surface, the sunlight will not be orthogonally incident on the panel, which yields a lower power density due to permanent curvature the solar surface. The embodiments in the following discussion use a thin curved flexible laminate as the panel substrate, such that, once deployed, the substrates can be stretched to reduce the curvature to a flat or almost flat configuration, thereby getting better power efficiency than permanently curved panel substrates. These laminates are framed along the straight edges, populated with cells on their concave side, and stowed cell side-to-cell side package for launch, providing stiffer out of plane structure and cell separation.

When stowed, a solar array blanket can suffer from cell-to-cell contact, creating cell-to-cell stiction (i.e., static friction that needs to be overcome to enable relative motion of stationary objects in contact), thus requiring additional blanket separation forces during deployment. The use of curved panels where the solar cells are on the concave side can allow for the panels to be folded up, while still avoiding cell-to-cell contact.

Figure 19:
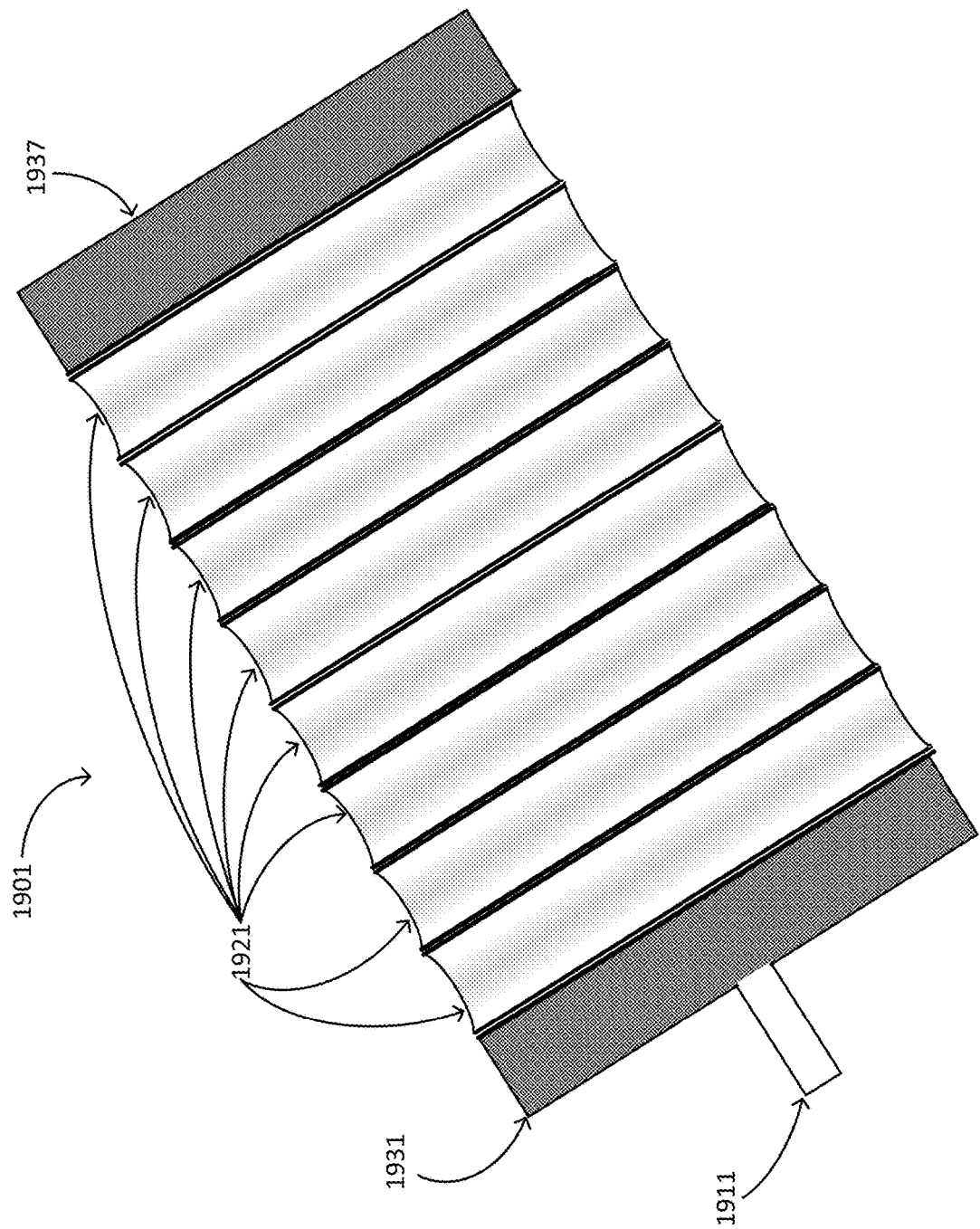
FIG. 19 illustrates an embodiment for a solar array structure using multiple solar panels that are concave when in a relaxed state.

FIG. 19 illustrates an embodiment for a solar array structure 1901 using multiple solar panels 1921 that are each concave when in a relaxed state. FIG. 19 shows the array structure 1901 when the frame structure is mostly, but not yet fully, deployed, such that the flexible panels 1921 have folded out, but still in their relaxed concave state and yet pulled flat. The structure of FIG. 19 can be similar to that illustrated in FIG. 6B, but with the panels 1921 replacing the blanket 621. More specifically, the panels 1901 are connected between a T-shaped rigid structure yoke 1911 and an outboard T-structure (below the panels 1921 in this view, except portion under solar array panel 1937) that are connected by sections of rigid beam (also not shown in the view of FIG. 19). In one set of embodiments, the frame structure can be as described above with respect to FIGS. 6A and 6B and can again include one or both of a solar cell array 1931 on the T-shaped rigid structure yoke 1911 and a solar array structure 1937 on the outboard T-structure.

In the embodiment of FIG. 19, each panel 1921 extends laterally or longitudinally (i.e., sideways relative to the extension direction) for the full width of the solar array structure 1901, similarly to the arrangement of FIGS. 6A and 6B. In other embodiments, each panel 1921 could be replaced by a pair of panels, one to either side of the sections of the rigid beams of the frame structure, with a gap between, similar to the arrangement of FIGS. 5A-5D. The following discussion will focus on the embodiment of FIG. 19 for a Z-fold array with curved flex structures, but can be extended to an embodiment with split panels similarly to how the embodiments of FIGS. 6A and 6B are related to those of FIGS. 5A-5D as discussed above.

Figure 20:
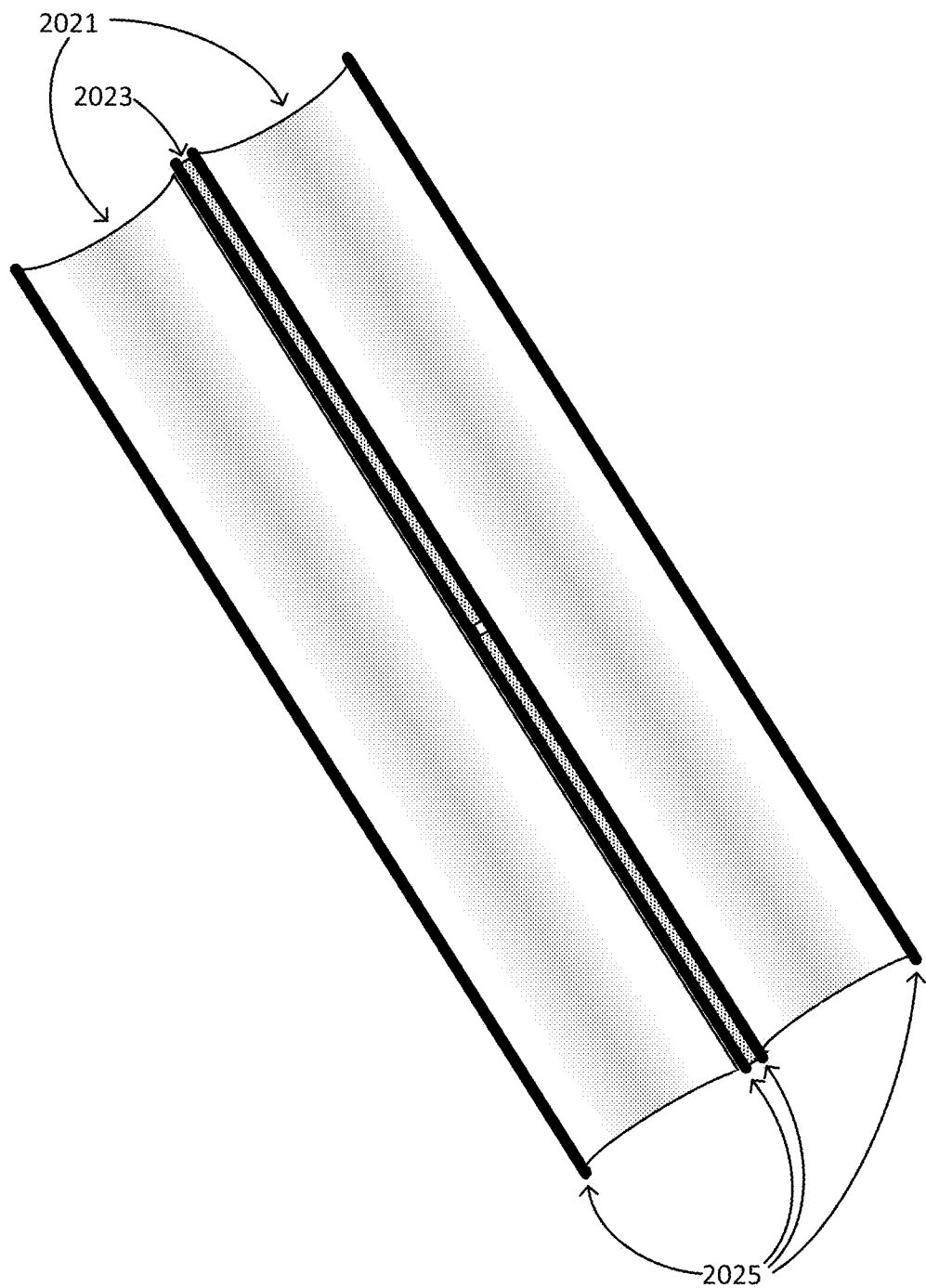
FIG. 20 illustrates a pair of panels from the solar array structure of FIG. 19 when deployed, but not yet stretched into the flat configuration by the frame of other tensioning structure.

FIG. 20 illustrates a pair of panels 2021 from solar array structure of FIG. 19 when deployed, but not yet stretched into the flat configuration by the frame or other tensioning structure. Each panel 2021 includes a thin curved flexible laminated substrate, with the solar cells on the upward facing (in this view) concave side over the panel's substrate. Each panel 2021 does not have a frame along the curved sides, but has frame members 2025 along the longer longitudinal (in this view) sides. This arrangement provides stiffness in the deployed state and when in the stowed configuration during launch by the combination of frame members 2025 and curvature of the panels 2021, but allows for the panels to be stretched flat for maximum light capture by the panels 2021 when fully deployed while having lateral rigidity from the frame members 2025. In this embodiment, the panels 2021 can be connected at their frames 2025 by a flexible membrane hinge 2023.

A number of embodiments are possible for the frame, panel, and hinge structure of FIGS. 19 and 20. For example, a flexible hinge membrane 2023 can be formed of Kevlar, as a tape or other flexible fabric hinge, or other flexible material. Example embodiments for the substrates for the panels 2021 can be thin graphite sheets, fiberglass, or other relatively stiff but flexible material of, for example, 5-10 mils thick. The substrate needs to be flexible enough so that it can be stretched to be more or less flat by the frame or other deployment structure to tension the panels when fully deployed, but provide enough stiffness when relaxed in the stowed configuration for launch. The solar cells are on the concave (upward in the figure) surface. The longitudinal frame members 2025 can, depending on the embodiment, be formed of graphite, aluminum, or other material with a rectangular cross-section hollow frame members of around ¼ to ½ inch in width (the axial direction) and ¼ to ½ inch in the vertical direction (into the page in FIG. 20). For an embodiment for use with a medium sized satellite, the individual panels could be around 8 ft wide and 1-1½ ft wide and six to ten panels can be used, but these dimensions and numbers can be varied to suit the size and power requirement of a satellite or other spacecraft.

Figure 21:
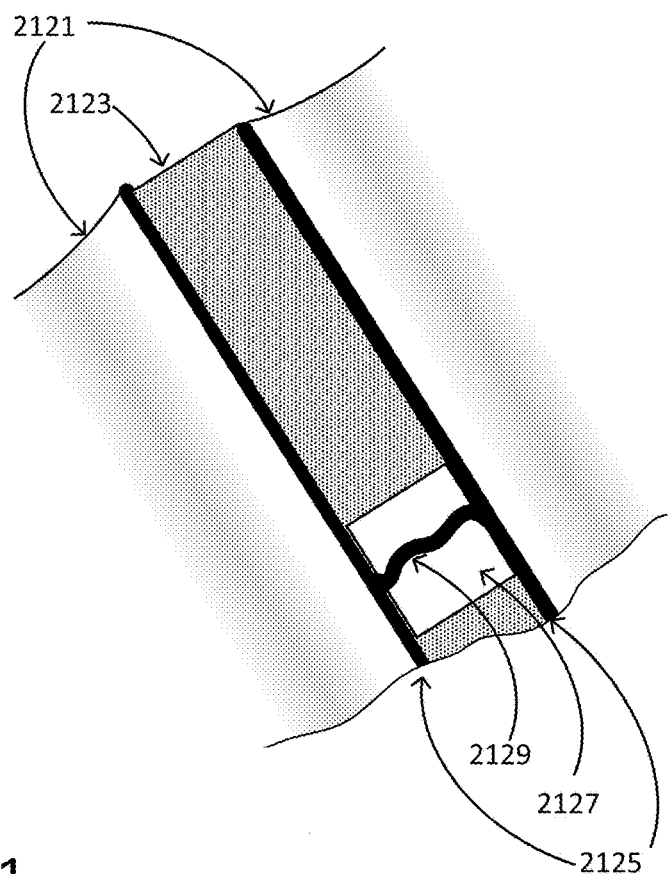
FIG. 21 shows a portion of FIG. 20 in more detail.

FIG. 21 shows a portion of FIG. 20 in more detail, showing a portion of two panels 2121 and corresponding frame members 2125 connected by the flexible hinge membrane 2123. A wiring harness or harnesses can run down the back of the array structure as illustrated in FIG. 19, connecting the solar array structure 1937 on the outboard T-structure, the individual solar panels 1921, and solar cell array 1931 on the T-shaped rigid structure yoke 1911 to provide power to the satellite. The flexible hinge membrane 2123 can include a harness routing cutout or cutouts 2127 through which the wiring harness 2129 can run. In one embodiment, a single harness running down the middle of the solar array structure can be used and the harness routing cutout 2127 can be centered laterally in the flexible hinge membrane 2123.

Figure 22:
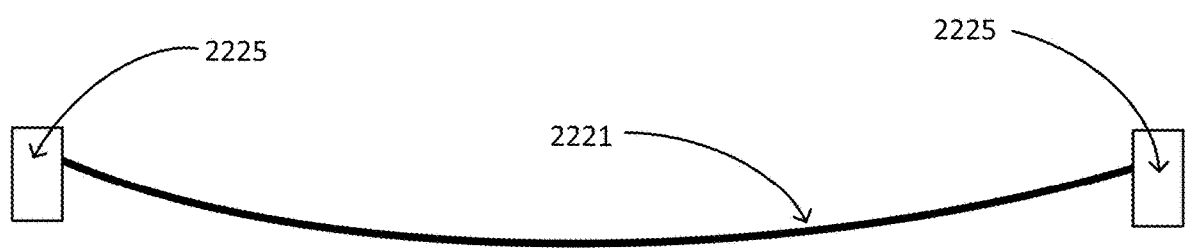
FIG. 22 is a side view of a single panel illustrating the curvature when in a relaxed state.

FIG. 22 is a side view of a single panel illustrating the curvature when in a relaxed state. To either side of the flexible substrate 2221 are the longitudinal frame members 2225 to provide rigidity in the longitudinal direction. The solar cells are formed on the upward facing, concave surface of the flexible substrate 2221. Curvature of the flexible substrate 2221 in the relaxed state provides rigidity when the array is in its stowed configuration and, by placing the solar cells on concave side, helps to avoid cell-to-cell contact and stiction while stowed. When stretched flat in the deployed configuration, the solar efficiency can be maximized as the incident light can be perpendicular to the full array's solar cells.

Figure 23:
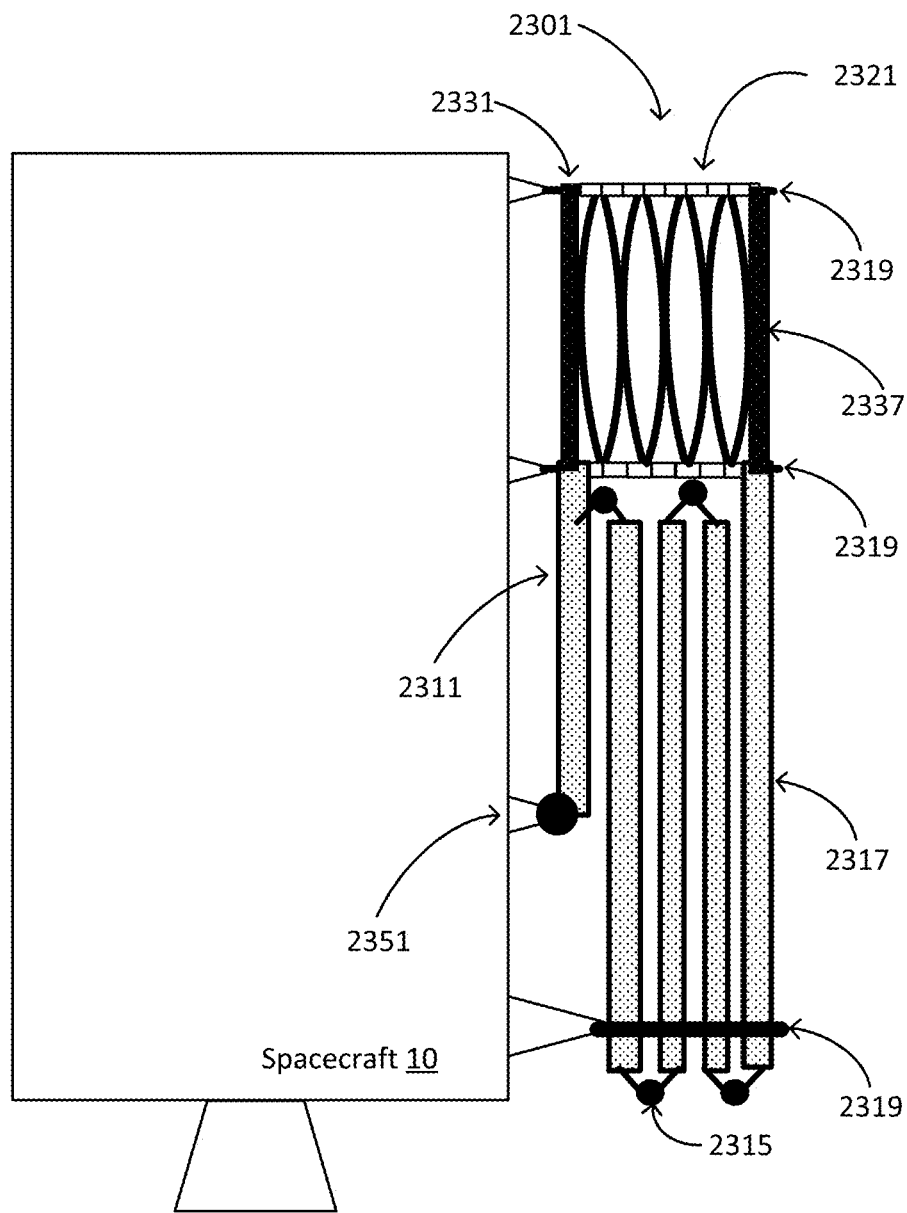
FIG. 23 illustrates an embodiment of the Z-fold solar array with curved substrate panels in its stowed configuration as mounted on a spacecraft.

FIG. 23 illustrates an embodiment of the Z-fold solar array 2301 with curved substrate panels 2321 in its stowed configuration as mounted on the body of a spacecraft folded in an accordion manner to form a stowed package. FIG. 23 is arranged and numbered similarly to FIG. 6A, but with the blanket 621 now replaced by the curved panels 2321. The inboard T-structure 2311 of the array structures frame is attached to the space craft 10 at mount 2351 and can again be provided with a solar cell array 2331. The rigid beams of the intermediate frame members are connected to the outboard T-structure 2317 by the hinges 2315. The outboard T-structure 2317 can again be provided with a solar cell array 2337 to provide power when in the stowed configuration. Unlike in FIG. 6A, the outboard T-structure 2317 can use have a cross member (on which solar cell array 2337 is mounted) that will fold back towards the spacecraft 10 during deployment, as will be described further with respect to FIGS. 28A-28C. The frame is held in the stowed configuration by one or more hold-downs 2319. The details of the frame structure can be as described above with the various blanket based embodiments, including those using motorized large angle flexure pivot hinges, as well as the spring loaded hinges of FIG. 6A. The panels 2321 in their relaxed state are also Z-folded so that their lateral frame are in contact and also held in place by one or more hold-downs 2319.

Figure 24:
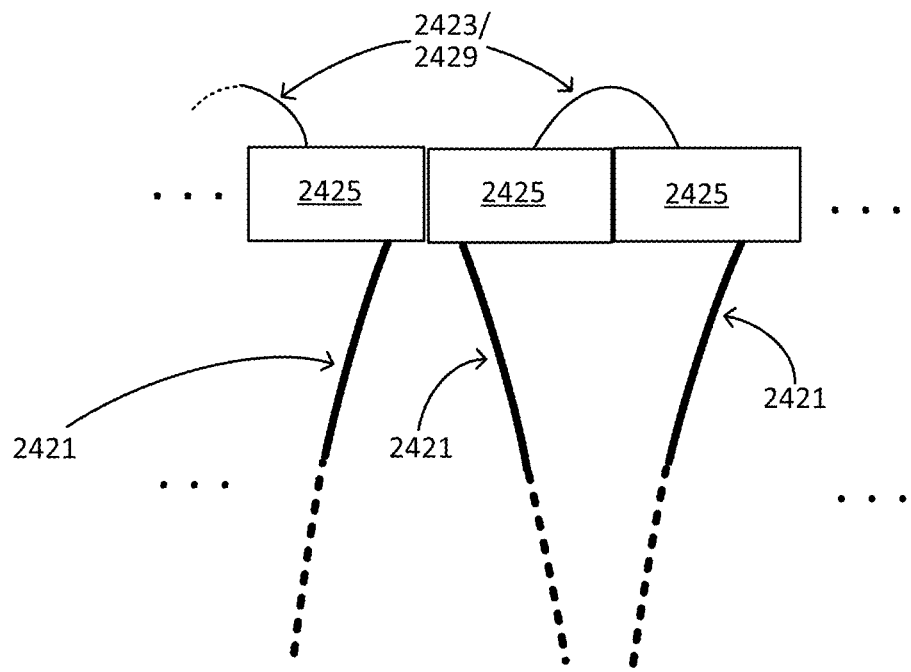
FIGS. 24 and 25 illustrate detail on the arrangement of the solar array panels in the stowed configuration and when partially deployed, respectively.
Figure 25:
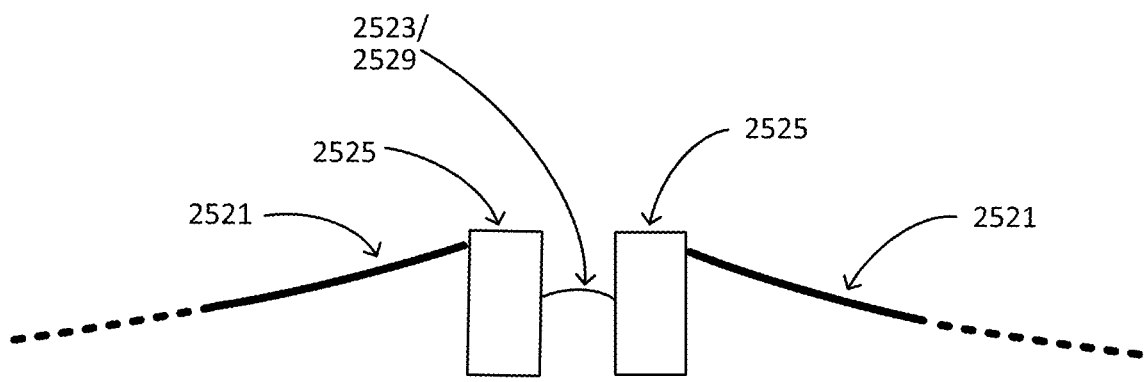

FIGS. 24 and 25 illustrate detail on the arrangement of the solar array panels in the stowed configuration and when partially deployed, respectively. More specifically, FIG. 24 shows an expanded view of the top part of several of the solar array panels when in the stowed configuration of FIG. 23. Three of the panels 2421 are shown along with their corresponding longitudinal frame members 2425. In this stowed configuration, the longitudinal frame members 2425 are side to side and one or more hold-downs (not shown in FIG. 24, 2319 in FIG. 23) would run left to right through the longitudinal frame members 2425. The center and right panels' frame members are connected by a flexible hinge membrane 2423 along the upper side, while the center and left panels' frame members would be connected by a flexible hinge membrane at the lower side and the left panel's frame member 2425 would be connected to that of the unshown panel further to the left. The wiring harness 2429 would run between the panels and frame members similarly to the flexible hinge membrane 2423.

FIG. 25 shows the center and right panels of FIG. 24 when folded out, but not yet stretched flat. The substrates of the panels 2521 to either side have the concave side (on which the solar cells are mounted) upward and extend to either side of the corresponding frame members 2525, which are connected by the flexible hinge membrane 2523. The wiring harness 2529 can run through a routing cutout in the flexible hinge membrane 2523.

Figure 27:
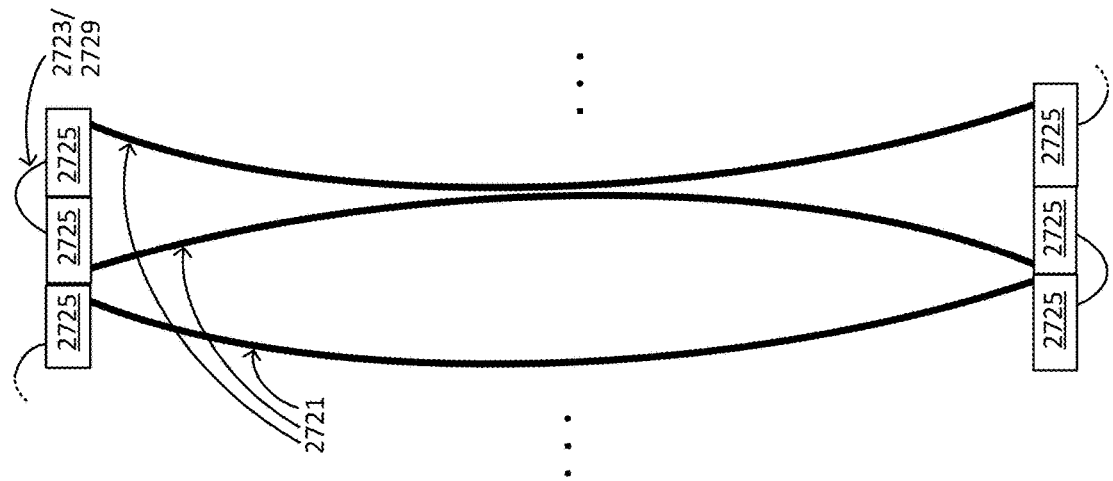
FIGS. 26 and 27 illustrate more detail on the steel frames for the panels in their stowed configuration for a flat panel embodiment and the curved flexible substrate embodiment
Figure 26:
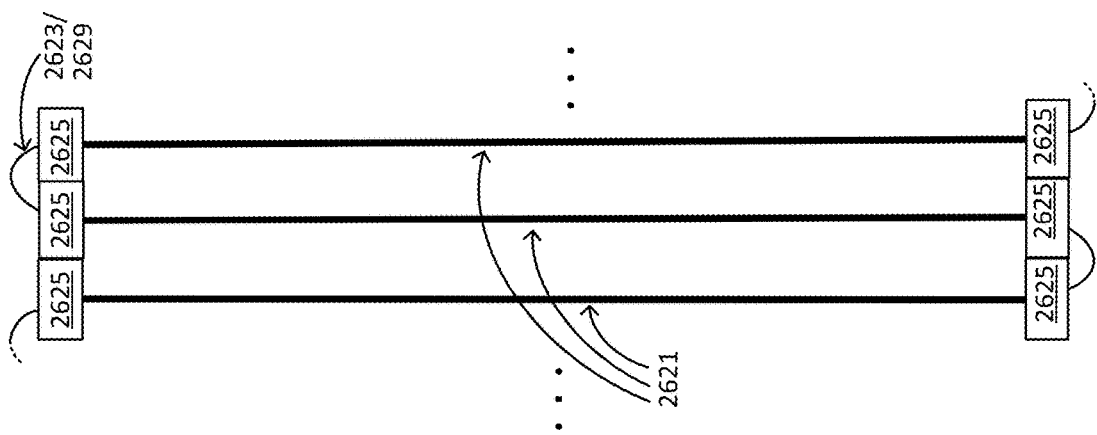

FIGS. 26 and 27 illustrate more detail on the steel frames for the panels in their stowed configuration for a flat panel embodiment and the curved flexible substrate embodiment, respectively, where FIG. 27 corresponds to the embodiment of FIG. 23 and FIG. 26 is provided for comparison. In both cases, three stowed panels 2621/2761 and their longitudinal frame members 2625/2725 are shown, but these can be part of a larger set of such panels, such as shown in FIG. 23, and would be clamped in place with hold-downs. The flexible hinge membranes 2623/2723 connect every second pair of adjacent longitudinal frame members 2625/2725, alternating between top and bottom pairs, allowing the frames to fold out as illustrated in FIG. 19 and discussed in more detail with respect to FIGS. 24 and 25. The wiring harnesses 2629/2729 can again run between the panels and frame members similarly to the flexible hinge membrane 2623/2723.

The solar cells are on the sides of the panels 2621/2721 that will be upward facing when the solar array structure is deployed. For FIG. 27, this will be the concave side of the panels 2721 and the corresponding sides of the panels 2621 in FIG. 26. More explicitly, the solar are formed on the left side surface of the center panel 2621/2721 and on the right side surfaces of the left and right panels 2621/2721. In terms of dimensions, in an application for a mid-sized satellite, the panels 2621/2721 may be a foot or a few feet wide (vertical direction in FIGS. 26 and 27) and the width of the frame members in the horizontal direction of FIGS. 26 and 27 may be ¼ to ½ inches, for example.

Considering just FIG. 26, the left pair of panels 2621 will have their solar cells on their facing surfaces, as will other panel pairs hinged at the bottom. If, for example, the frame widths are ¼ to ½ inches wide, leaving the panels with a center to center separation of ¼ to ½ inches, with space between their surfaces less due to the thickness of the panels 2621. If thin panel substrates are used, during launch the vibration of the spacecraft can cause these facing surface to contact and result in solar cell contact and stiction, possibly damaging the solar array as well as making it more difficult to deploy. To reduce this effect, the panels 2621 can be made stiffer, but this will increase mass for the solar array structure. Additionally, this may also make the panels thicker, further reducing the panels separation when stowed.

In the embodiment of FIG. 27, the substrate for the panels 2721 are curved with a slight cylindrical curvature and the solar cells bonded on the concave side. (In the example, the cylindrical curvature is roughly that of an arc section of a circular cylinder extending laterally in the direction of the frame members 2725, but other cylindrical cross-sections can be used.) This arrangement results in added stiffness and greater separation at the centers of the panels 2721: for example, if the widths of frames 2725 are ¼ to ½ inches wide, the panels with a center to center separation of twice that (½ to 1 inches, less the thickness of the thin panel substrates). This makes it less likely for the solar cells to contact due to launch vibration or suffer from stiction during deployment. The convex sides of the panels 2721 (the backs of the panels, with solar cells) can be in contact, further increasing the resistance to vibration. This allows for thin lightweight panels to be used, which can then be stretched flat by the tensioning mechanism after deployment.

Consequently, the use of the thin, flexible panels with this cylindrically curved substrates can provide a light weight solar array structure with increased stiffness when stowed. The panel sides on which the solar cells are bonded have greater separation and are stiffer due to the cylindrical curvature. The substrate curvature is a function of frame thickness and the curvature should be sized to be able to be straightened to flat or near flat using the deployment or tensioning mechanism.

Figure 28A:
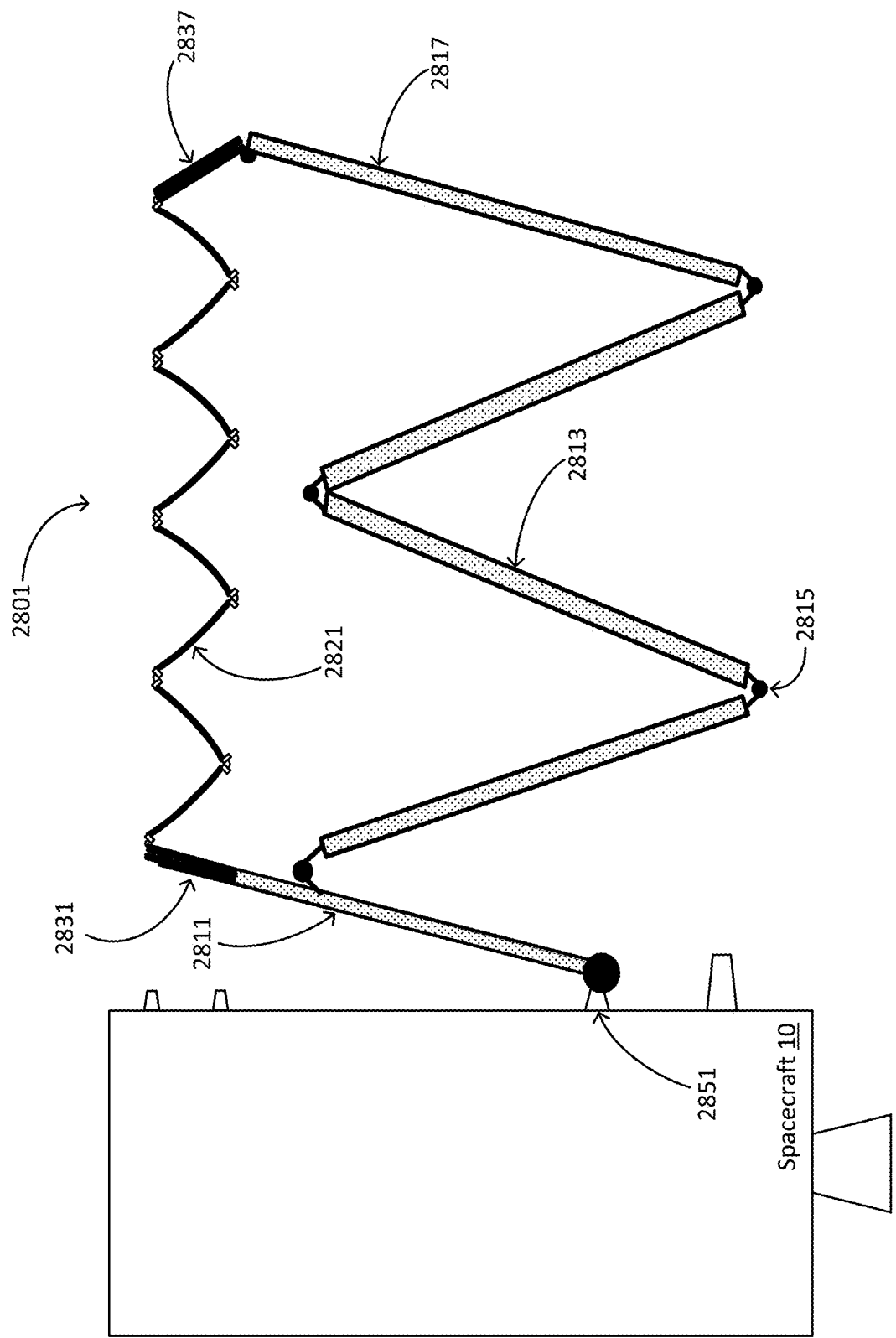

FIGS. 28A-28C illustrate the deployment of an embodiment of the solar array structure from the stowed configuration of FIG. 23, where the elements are similarly numbered. Generally, the deployment process can be similar to that described with respect to FIGS. 5A-5D and FIGS. 6A and 6B, which can be referred to for additional detail.

FIG. 28A shows the solar array structure 2801 at an early phase of the deployment, where the hold-downs (2319 of FIG. 23) have been released and the frame begins to expand. The embodiment here uses spring loaded hinges 2815, similar to hinges 515 and 615 of FIGS. 5A-5D and FIGS. 6A and 6B, to extend the frame members, but other embodiments can be used, including the motorized flexure hinges of FIG. 12 and related figures. The hinges 2815 connect the frame members of the inboard T-yoke 2811, the intermediate frame members 2813, and the outboard T-yoke 2817, where the set of panels 2821 connect between the cross members of the inboard T-yoke 2811 and the outboard T-yoke 2817. The inboard T-yoke 2811 is connected to the spacecraft 10 at mount 2851 and can include the solar cell array 2831 on its cross member, and the outboard T-yoke 2817 can also include a solar cell array 2837 on its cross member. The frame structure of the embodiment of FIGS. 23 and 28-30 differs from the earlier presented embodiments in that the cross member with solar cell array 2837 of outboard T-yoke 2817 folds back on itself toward the spacecraft as the frame deploys, providing the outward facing rigid panel when stowed as shown at 2337 in FIG. 23, while rotating to be upward facing when the structure is deployed.

FIG. 28B shows the solar array 2801 almost, but not fully, deployed at the point where the flexible panels 2821 have unfolded but are still in their curved, relaxed state. FIG. 28B corresponds to a side view of the array in same partially deployed state as shown in FIG. 19. The inboard T-yoke 2811, the intermediate frame members 2813, and the outboard T-yoke 2817 are not yet fully extended. The cross member with solar cell array 2837 of the outboard T-yoke 2817 is mostly, but not completely, folded back toward the flexible panels 2821.

FIG. 28C shows the arrays structure 2801 when fully deployed. In FIG. 28C the spacecraft 10, intermediate frame members 2813, and the outboard T-yoke 2817 (aside from the cross member with solar cell array 2837), are not shown so that the arrangement of the panels 2821 and the cross member with solar cell array 2837 are easier to see. The inboard T-yoke 2811, the intermediate frame members 2813, and the outboard T-yoke 2817 will be flat or near flat to stretch the substrates of the flexible panels 2821 flat. The rigid panel of the cross member with solar cell array 2837 of the outer T-yoke 2817 is also folded back to flat and upward facing, as is the solar cell array 2831 of the inner T-yoke 2811. The puts the solar cells of the flexible panels 2821 and the cross members of both end T-yoke into a plane, which can then be aligned to be perpendicular with the incident sunlight by the gimbal control or solar array drive assembly of the mount 2851.

A number of alternate embodiments are possible. For example, as illustrated in FIG. 19 and subsequent figures, the example embodiments use panels 1921 that extend the full width (in the longitudinal direction) of the array structure 1901, similarly to blanket arrangement 621 in FIG. 6B. In an alternate embodiment, the single panels could be replaced pairs of panels, similar to the blanket pair 521A and 521B of FIG. 5C, in which case the deployment frame could be similar to that described with respect to FIG. 5A-5D and the variations of FIGS. 9A-9D. In other embodiments, a frame structure incorporating motorized flexure hinges 1215 as illustrated in FIG. 12 and developed in FIGS. 13-18. In still other embodiments, deployment mechanisms other than the foldable frame structure could be used, such deployment structure that could extend out of canister or telescoping or rod based mechanisms to deploy and stretch flat the panels.

Figure 29:
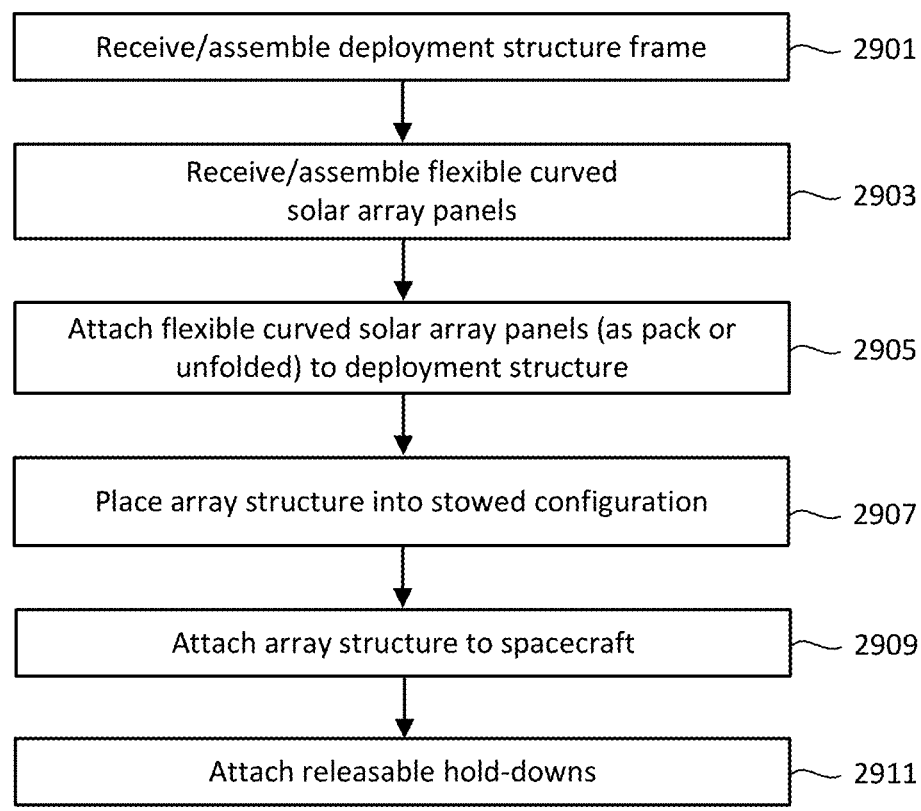
FIGS. 29 and 30 are flowcharts respectively describing embodiments for the stowing and the deploying of the Z-fold solar array with flexible curved substrate panels.
Figure 30:
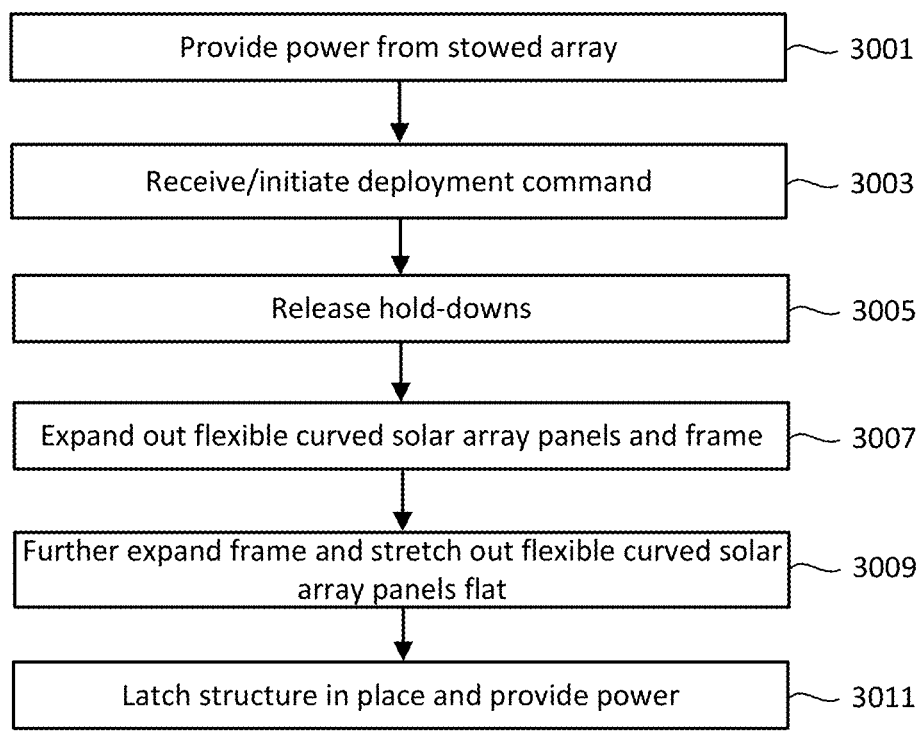

FIGS. 29 and 30 are flowcharts respectively describing embodiments for the stowing and the deploying of the Z-fold solar array with flexible curved substrate panels. FIG. 29 begins at step 2901 with receiving, which can include the complete or partial construction, of the frame of the deployment structure including the T-shaped yoke structure (2811), the end T-shaped structure (2817), the one or more rigid members (2813), and the hinges (2815). If an alternate deployment mechanism, such as described in the preceding paragraph, that corresponding structure would be received/assembled. At step 2903 the array structure of flexible curved substrate panels (2821) is received, which can include the complete or partial construction of the flexible curved substrate panels of the solar array. For example, the panels, longitudinal frame members, and hinge membranes could be received separately and assembled; the structure could already be fabricated; or a partially assembled structure could be received and assembly completed. Step 2903 can be performed before, after, or concurrently with step 2901.

The flexible curved substrate panel structure of the solar array is attached to the frame of the deployment structure at step 2905, with one end being attached to the yoke cross-member arm of T-structure (2811) and other end to the cross-member arm of the end T-structure (2817). The flexible curved substrate panel structure can already be folded, or partially folded, in an accordion manner along its length to form a pack when attached, or can be folded after attachment, such as part of step 2907. The full structure (2801) is then placed into its stowed configuration at step 2907 by folding up the frame of the deployment structure and, if not already done, the flexible curved substrate panel structure so that the blanket pack or packs are between the cross-arms of the T-structures (2811 and 2817).

In step 2909 the panels of the array structure (2801) are attached to the spacecraft 10 by the bottom end of the central member of the yoke T-structure (2811) as shown in the side view of FIG. 28A, for example. Depending on the embodiment, the panels of the solar array structure (2801) can be attached after being placed into a stowed configuration at step 2907, or can be assembled or partially assembled (parts or all of steps 2901, 2905, or 2905) while attached and then placed into the stowed figuration, so that step 2909 could be performed at some point before step 2907. Once attached and in stowed configuration, releasable hold-downs (2319) can be attached at step 2911 to hold the stowed solar array structure (2801) in place until deployment.

FIG. 30 is a flowchart of an embodiment of the deployment process and begins once the spacecraft has been launched. Starting at step 3001, for embodiments that include photovoltaic solar cell arrays (2337/2837) on the cross-arms of the outboard T-structure (2337/2817), the panels of the array structure (2801) can provide power prior to deployment. At step 3003, the control circuits on the spacecraft, such as the command and data handling subsystem (C&DH) 210, initiates a deployment command. This command can be received from a ground station or originate on the spacecraft itself, such as in response to a specified set of conditions.

At step 3005 the hold-downs (2319) are released by the control circuits of the spacecraft, such as by pulling out of a pin by a servo or actuator, and the Z-fold solar array with flexible curved substrate panels and frame begin to expand at step 3007, such as is illustrated in FIGS. 28A and 28B. The expansion can be implemented by use of graphite or other spring structures incorporated into the structure of the hinges (2815) or other automatic device or could incorporate a motor. At step 3009, the frame is further expanded to stretch the flexible panels to be flat or near flat. The structure is then latched into its deployed arrangement at step 3011, such as by mechanical or magnetic latches, where these could be incorporated into the hinges (2815), separate latches, or a combination of these. Once deployed, it can begin to provide power to the spacecraft, including being rotated or angled by the solar array drive assembly.

One embodiment includes an apparatus including a solar array foldable in a first direction in an accordion manner to form a stowed pack when in a stowed configuration and a deployable frame structure connected to the foldable solar array. The foldable solar array includes a plurality of panels and one or more flexible hinges. Each panel comprises: a pair of rigid frame members extending laterally relative to the first direction; a corresponding flexible panel substrate connected between, and having a cylindrical curvature between, the pair of rigid frame members; and a plurality of solar cells on a concave surface of the corresponding flexible panel substrate. Each of the flexible hinges is connected between one of the rigid frame member of a pair of the panels to form the panels into a structure foldable in the first direction. The deployable frame structure is configured to extend the foldable solar array from the stowed configuration to a deployed configuration in which the panels are flat and stretched to flatten the flexible panel substrates in the first direction.

One embodiment includes a method that includes assembling a solar array foldable in a first direction in an accordion manner, the solar array comprising: a plurality of panels each having a flexible substrate with a cylindrical curvature connected between a corresponding pair of rigid frame members, a concave surface of each of the flexible substrates having a plurality solar cells mounted thereon; and one or more flexible hinges each connected between one of the rigid frame member of an adjacent pair of the panels to form the panels into a structure foldable in the first direction. The method also includes: folding the solar array in the first direction to form a stowed pack; attaching the solar array to a deployable frame structure configured to extend the foldable solar array from a stowed configuration of the stowed pack to a deployed configuration in which the panels are flat and stretched to flatten the flexible panel substrates in the first direction; attaching the deployable frame structure to a spacecraft; and placing the deployable frame structure and the stowed pack into the stowed configuration held in place on the spacecraft with one or more releasable hold-downs.

One embodiment includes a spacecraft comprising: a spacecraft body; and a solar array foldable in a first direction in an accordion manner to form a stowed pack when in a stowed configuration. The foldable solar array comprises: a plurality of panels, one or more flexible hinges, and a deployable frame structure. Each panel includes: a pair of rigid frame members extending laterally relative to the first direction; a corresponding flexible panel substrate connected between, and having a cylindrical curvature between, the pair of rigid frame members; and a plurality of solar cells on a concave surface of the corresponding flexible panel substrate. Each of the flexible hinges is connected between one of the rigid frame member of a pair of the panels to form the panels into a structure foldable in the first direction. The deployable frame structure is connected to the foldable solar array and configured to extend the foldable solar array away from the spacecraft body in the first direction from the stowed configuration to a deployed configuration in which the panels are flat and stretched to flatten the flexible panel substrates in the first direction. The spacecraft also includes one or more hold-downs configured to hold the foldable solar array and the deployable frame structure in the stowed configuration and release to allow the foldable solar array and the deployable frame structure to extend into the deployed configuration.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus, comprising:
    a solar array foldable in a first direction in an accordion manner to form a stowed pack when in a stowed configuration and comprising:
        a plurality of panels, each panel comprising:
            a pair of rigid frame members extending laterally relative to the first direction;
            a corresponding flexible panel substrate connected between, and having a cylindrical curvature between, the pair of rigid frame members; and
            a plurality of solar cells on a concave surface of the corresponding flexible panel substrate; and
        one or more flexible array hinges each connected between one of the rigid frame member of a pair of the panels to form the panels into a structure foldable in the first direction; and
    a deployable frame structure connected to the foldable solar array and configured to extend the foldable solar array from the stowed configuration to a deployed configuration in which the panels are flat and stretched to flatten the flexible panel substrates in the first direction.

2. The apparatus of claim 1, wherein the deployable frame structure comprises:
    a T-shaped yoke structure having a central member and a cross-member arm, the cross-member arm attached to the foldable solar array at a first end in the first direction and the central member configured to mount to a spacecraft;

a T-shaped end structure having a central member and a cross-member arm, the cross-member arm attached to the foldable solar array at a second end in the first direction;

one or more rigid beams; and a plurality of frame hinges connecting the T-shaped yoke structure, the one or more rigid beams, and the T-shaped end structure, including a first frame hinge connected to the T-shaped yoke structure and a second frame hinge connected to an end of the central member of the T-shaped end structure.

3. The apparatus of claim 2, the deployable frame structure further including:

a first solar array on a surface of the cross-member arm of the T-shaped end structure, the first solar array configured to be facing outward from a surface of a spacecraft to which the apparatus is attached when the deployable frame structure is in the stowed configuration.

4. The apparatus of claim 3, wherein the cross-member arm of the T-shaped end structure is configured to fold back towards the foldable solar array when in the deployed configuration such that the first solar array faces in the same direction as the plurality of solar cells of the plurality of panels when in the deployed configuration.

5. The apparatus of claim 3, the deployable frame structure further including:

a second solar array on a surface of the cross-member arm of the T-shaped yoke structure, the second solar array configured to be facing in the same direction as the plurality of solar cells of the plurality of panels when in the deployed configuration.

6. The apparatus of claim 2, wherein one or more of the plurality of frame hinges includes:

a spring configured to extend the deployable frame structure to flatten the flexible panel substrates in the first direction.

7. The apparatus of claim 2, further comprising:

one or more hold-downs configured to hold the foldable solar array and the deployable frame structure in the stowed configuration and to release to allow the foldable solar array and the deployable frame structure to extend into the deployed configuration.

8. The apparatus of claim 1, wherein the one or more flexible array hinges include a flexible hinge membrane.

9. The apparatus of claim 8, further comprising:

a wiring harness connecting the solar cells of the plurality of panels, wherein the one or more flexible array hinges include a cutout for passage of the wiring harness.

10. The apparatus of claim 1, wherein, when formed into the stowed pack, the plurality of panels are arranged such that the concave surfaces of adjacent panels face each other.

11. A spacecraft, comprising:

a spacecraft body;

a solar array foldable in a first direction in an accordion manner to form a stowed pack when in a stowed configuration, comprising:

a plurality of panels, each panel comprising:

a pair of rigid frame members extending laterally relative to the first direction;

a corresponding flexible panel substrate connected between, and having a cylindrical curvature between, the pair of rigid frame members; and a plurality of solar cells on a concave surface of the corresponding flexible panel substrate; and one or more flexible array hinges each connected between one of the rigid frame member of a pair of the panels to form the panels into a structure foldable in the first direction; and a deployable frame structure connected to the foldable solar array and configured to extend the foldable solar array away from the spacecraft body in the first direction from the stowed configuration to a deployed configuration in which the panels are flat and stretched to flatten the flexible panel substrates in the first direction; and one or more hold-downs configured to hold the foldable solar array and the deployable frame structure in the stowed configuration and release to allow the foldable solar array and the deployable frame structure to extend into the deployed configuration.

12. The spacecraft of claim 11, comprising:

an antenna configured to receive control instructions; and one or more control circuits connected to receive the control instructions from the antenna and release the one or more hold-downs in response to a control signal.

13. The spacecraft of claim 11, wherein the foldable solar array is configured to provide power to the spacecraft when in the stowed configuration.

14. The spacecraft of claim 11, wherein the deployable frame structure comprises:

a T-shaped yoke structure having a central member and a cross-member arm, the cross-member arm attached to the foldable solar array at a first end in the first direction and the central member configured to mount to a spacecraft;

a T-shaped end structure having a central member and a cross-member arm, the cross-member arm attached to the foldable solar array at a second end in the first direction;

one or more rigid beams; and a plurality of frame hinges connecting the T-shaped yoke structure, the one or more rigid beams, and the T-shaped end structure, including a first frame hinge connected to the T-shaped yoke structure and a second frame hinge connected to an end of the central member of the T-shaped end structure.

15. The spacecraft of claim 14, wherein one or more of the plurality of frame hinges includes:

a spring configured to extend the deployable frame structure to flatten the flexible panel substrates in the first direction.

16. The spacecraft of claim 11, wherein the one or more flexible array hinges include a flexible hinge membrane and the foldable solar array further comprises:

a wiring harness connecting the solar cells of the plurality of panels, wherein the one or more flexible array hinges include a cutout for passage of the wiring harness.

17. The spacecraft of claim 11, wherein, when formed into a stowed pack, the plurality of panels are arranged such that the concave surface of adjacent panels face each other.

18. The spacecraft of claim 14, the deployable frame structure further including:

a first solar array on a surface of the cross-member arm of the T-shaped end structure, the first solar array configured to be facing outward from a surface of the spacecraft when the deployable frame structure is in the stowed configuration.

19. The spacecraft of claim 18, wherein the cross-member arm of the T-shaped end structure is configured to fold back towards the foldable solar array when in the deployed configuration such that the first solar array faces in the same direction as the plurality of solar cells of the plurality of panels when in the deployed configuration.

20. The spacecraft of claim 18, the deployable frame structure further including:
   a second solar array on a surface of the cross-member arm of the T-shaped yoke structure, the second solar array configured to be facing in the same direction as the plurality of solar cells of the plurality of panels when in the deployed configuration.

* * * * *